(12) United States Patent
Yoneda

(10) Patent No.: US 7,286,946 B2
(45) Date of Patent: Oct. 23, 2007

(54) TRANSMISSION CHARACTERISTIC MEASURING DEVICE TRANSMISSION CHARACTERISTIC MEASURING METHOD, AND AMPLIFIER

(75) Inventor: Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/512,938

(22) PCT Filed: Apr. 25, 2003

(86) PCT No.: PCT/JP03/05396

§ 371 (c)(1),
(2), (4) Date: Aug. 12, 2005

(87) PCT Pub. No.: WO03/094576

PCT Pub. Date: Nov. 13, 2003

(65) Prior Publication Data

US 2006/0100809 A1    May 11, 2006

(30) Foreign Application Priority Data

Apr. 30, 2002    (JP)    ............... 2002-129307

(51) Int. Cl.
*G06F 19/00* (2006.01)

(52) U.S. Cl. ............... 702/62; 702/109; 702/116; 702/189

(58) Field of Classification Search ............... 702/109, 702/111, 112, 116, 124, 189, 62; 324/615, 324/612, 600; 341/126, 138, 140; 381/71.1–71.14, 381/56, 58, 59, 93, 66, 94.1; 701/45

See application file for complete search history.

(56) References Cited

U.S. PATENT DOCUMENTS

| | | | | |
|---|---|---|---|---|
| 5,185,801 A | * | 2/1993 | Meyer et al. | ............... 381/59 |
| 5,602,629 A | * | 2/1997 | Saito et al. | ............... 399/58 |
| 6,785,391 B1 | * | 8/2004 | Emura et al. | ............... 381/61 |
| 6,990,205 B1 | * | 1/2006 | Chen | ............... 381/17 |

FOREIGN PATENT DOCUMENTS

JP    8-184488 A    7/1996

(Continued)

OTHER PUBLICATIONS

Pope et al., 'A Represenation and Infrastructure for Flexible Sound Spatialisation', Jun. 15, 2000, ATON Report, pp. 1-16.*

(Continued)

*Primary Examiner*—Hal Wachsman
*Assistant Examiner*—Elias Desta
(74) *Attorney, Agent, or Firm*—Wolf, Greenfield & Sacks, P.C.

(57) ABSTRACT

A transfer characteristics measuring device automatically measures the transfer characteristics of each channel of a multi-channel acoustic reproduction system m a multi-channel acoustic reproduction environment, while allowing normal multi-channel reproduction to proceed. The transfer characteristics measuring device (5) comprises an object of measurement selecting section (51) that selects one of the objects of measurement according to the levels of the input signals for five channels being supplied to the objects of measurement and a transfer characteristics computing and determining section (52) that computes and determines the transfer characteristics of the object of measurement selected by the object of measurement selecting section (51).

27 Claims, 13 Drawing Sheets

FOREIGN PATENT DOCUMENTS

JP  11-243599 A  9/1999

OTHER PUBLICATIONS

Dwyer, 'Identification of Acoustic Objects in Motion from the Fourth Order Cumulant Spectrum', 1993, IEEE Publication, pp. 250-254.*

Haneda et al., 'Common-Acoustical-Pole and Residue Model and Its Applicaiton to Spatial Interpolation and Extrapolation of a Room Transfer Function', Nov. 1999, IEEE Publication, vol. 7, No. 6, pp. 709-717.*

Kamlet, 'Control Contractor Ceiling Loundspeakers: Technical Application Guide', Mar. 1999, pp. 1-20.*

* cited by examiner

US 7,286,946 B2

TRANSMISSION CHARACTERISTIC MEASURING DEVICE TRANSMISSION CHARACTERISTIC MEASURING METHOD, AND AMPLIFIER

TECHNICAL FIELD

This invention relates to a transfer characteristics measuring device and a transfer characteristics measuring method for measuring the transfer characteristics of an object of measurement, using an input signal being input to the object of measurement and an output signal output from the object of measurement in a multi-channel acoustic reproduction environment. The present invention also relates to a transfer characteristics measuring computer program to be executed by a transfer characteristics measuring device for measuring the transfer characteristics of an object of measurement. The present invention further relates to an amplifier containing a transfer characteristics measuring device for measuring the transfer characteristics of an object of measurement.

The present application claims priority from Japanese Patent Application No. 2002-129307 filed on Apr. 30, 2002, entire contents of which are hereby incorporated by reference into this application.

BACKGROUND ART

Standards have been provided for digital versatile discs (DVDs), or digital video discs, super audio compact discs (SACDs) and so on as mediums adapted to multi-channel reproduction using two or more than two independent channels.

The provisions on the positions of multi-channel speakers in these standards are based on the ITU-R (International Telecommunications Union Radio-communication Sector) recommendation BS-775-1 "Multi-channel Stereophonic Sound System with and without Accompanying Picture".

FIG. 1 of the accompanying drawings schematically illustrates a standard speaker arrangement for a multi-channel stereophonic sound system according to the recommendation. The illustrated speaker arrangement involves 5 channel speakers including a front left channel L, a front right channel R, a front center channel C, a surround left channel LS and a surround right channel RS as arranged relative to listener U. A so-called 5.1 channel arrangement obtained by adding a sub-woofer (SW) speaker for low frequency enhancement (LFE) as shown in FIG. 2 is also a standard arrangement.

On the other hand, an audio reproduction device for replaying such a multi-channel medium is provided with independent audio reproduction circuits and so many audio output terminals, the number of which corresponds to the maximum number of channels that the multi-channel medium has. If an optical disc stores an audio source having 5 channels or 5.1 channels, the output terminals of the reproduction device for replaying the optical disc are connected to an external amplifier having 5 or 5.1 channel input terminals and the external amplifier is connected to the speakers corresponding to the 5 channels or 5.1 channels.

Meanwhile, when measuring the acoustic characteristics of each channel in a multi-channel acoustic reproduction environment where a DVD is used as audio source, a pink noise or white noise that is called test tone is reproduced for each channel so as to be heard by the user and the inter-channel level difference, if any, is manually adjusted by a user typically by means of a remote control unit.

Some expensive high quality AV amplifiers are provided with a functional feature of automatically adjusting the level difference and the difference in the propagation distance. With such a feature, a gauging microphone is placed at a listening position and the amplifier is equipped in the inside thereof with a test generator. A test tone is reproduced on a channel by channel basis so as to be picked up by the microphone. Then, the signal representing the picked up test tone is used to compare the picked up test tone with the original test tone to measure the inter-channel level difference and the difference in the propagation distance (time) among the channels for automatic adjustment.

With any of the above described systems to be used in a multi-channel acoustic reproduction environment, a test tone needs to be reproduced for each channel.

DISCLOSURE OF THE INVENTION

It is an object of the present invention to provide a transfer characteristics measuring device and a transfer characteristics measuring method that can automatically measure the transfer characteristics of each channel of a multi-channel acoustic reproduction system in a multi-channel acoustic reproduction environment, while allowing normal multi-channel reproduction to proceed.

Another object of the present invention is to provide a transfer characteristics measuring computer program that can make a computer to operate as a transfer characteristics measuring device that automatically measures the transfer characteristics of each channel of a multi-channel acoustic reproduction system in a multi-channel acoustic reproduction environment, while allowing the system to operate for normal multi-channel reproduction.

Still another object of the present invention is to provide an amplifier in which the transfer characteristics of each channel is automatically measured in a multi-channel acoustic reproduction environment.

In an aspect of the present invention, the above objects are achieved by providing a transfer characteristics measuring device for measuring the transfer characteristics of each of n objects of measurement out of m ($n \leq m$) objects of measurement, using the input signals being input to the m objects of measurement and the output signals from the objects of measurement in an acoustic reproduction environment for m channels having mutually differentiated respective spatial positions, the device comprising: an object of measurement selecting means for selecting an object of measurement out of the n objects of measurement according to the levels of the input signals of the m channels being supplied to the m objects of measurement; and a transfer characteristics computing and determining means for computing the transfer characteristics of the object of measurement selected by the object of measurement selecting means according to the input signal being supplied to the object of measurement and the output signal of the object of measurement corresponding to the input signal, determining adoption of the transfer characteristics of the object of measurement and excluding the object of measurement from the m objects of measurement.

Thus, the object of measurement selecting means selects an object of measurement out of the n ($n \leq m$) objects of measurement according to the levels of the input signals of the m channels being supplied to the m objects of measurement. The transfer characteristics computing and determining means computes the transfer characteristics of the object of measurement selected by the object of measurement selecting means according to the input signal being supplied to the object of measurement and the output signal of the object of measurement corresponding to the input signal, determines adoption of the transfer characteristics of the object of measurement and excludes the object of measurement from the m objects of measurement.

So far, it has been made clear that the acoustic characteristics of a 1-channel acoustic reproduction device can be measured by means of a method of measuring acoustic characteristics including the amplitude at the listening position and the impulse response (propagation time) of the acoustic reproduction device, using the sound of a piece of music or that of a movie film but not using a measurement signal of noise or impulse, picking up the sound reproduced from the acoustic reproduction device by means of a microphone at the listening position and analyzing the original signal being input to the acoustic reproduction device and the signal of the sound picked up by the microphone by means of a discrete cross spectrum method.

To the contrary, according to the present invention, it is possible to automatically measure and regulate the acoustic characteristics of each of a plurality of channels without taking out a test tone from the channel, while allowing normal multi-channel reproduction to proceed in a multi-channel acoustic reproduction environment, by measuring the transfer characteristics by means of a discrete cross spectrum method.

Thus, according to the invention, it is possible to automatically measure the acoustic characteristics of each of a plurality of channels for all the channels, using a reproduction source signal of the multi-channel, in a multi-channel acoustic reproduction environment where the multi-channel reproduction source signal is reproduced by a reproduction device for a DVD or the like that is connected to an amplifier such as an AV amplifier, which accommodates the multi-channel and is further connected to speakers.

After the measurement, the channels are automatically regulated by regulating the parameters of the AV amplifier.

In another aspect of the invention, there is provided a transfer characteristics measuring device for measuring the transfer characteristics of each of n objects of measurement out of m (n≦m) objects of measurement, using the input signals being input to the m objects of measurement and the output signals from the objects of measurement in an acoustic reproduction environment for m channels having mutually differentiated respective spatial positions, the device comprising: an object of measurement selecting means for selecting an object of measurement out of the m objects of measurement according to the levels of the input signals of the m channels being supplied to the m objects of measurement; and a transfer characteristics computing and determining means for computing the transfer characteristics of the object of measurement selected by the object of measurement selecting means according to the input signal being supplied to the object of measurement and the output signal of the object of measurement corresponding to the input signal for each frequency point and adopting the transfer characteristics of the object of measurement in concurrence with computing and adopting the transfer characteristics of each of the objects of measurement selected by the object of measurement selecting means from the n objects of measurement.

Thus, the object of measurement selecting means selects an object of measurement according to the levels of the input signals of the m channels being supplied to the m objects of measurement. The transfer characteristics computing and determining means computes the transfer characteristics of the object of measurement according to the input signal being supplied to the object of measurement and the output signal of the object of measurement corresponding to the input signal for each frequency point and adopts the transfer characteristics of the object of measurement in concurrence with computing and adopting the transfer characteristics of each of the objects of measurement selected by the object of measurement selecting means from the n objects of measurement for each frequency point.

In still another aspect of the invention, there is provided a transfer characteristics measuring method for measuring the transfer characteristics of each of n objects of measurement out of m (n≦m) objects of measurement, using the input signals being input to the m objects of measurement and the output signals from the objects of measurement in an acoustic reproduction environment for m channels having mutually differentiated respective spatial positions, the method comprising: an object of measurement selecting step of selecting an object of measurement out of the n objects of measurement according to the levels of the input signals of the m channels being supplied to the m objects of measurement; and a transfer characteristics computing and determining step of computing the transfer characteristics of the object of measurement selected in the object of measurement selecting step according to the input signal being supplied to the object of measurement and the output signal of the object of measurement corresponding to the input signal, determining adoption of the transfer characteristics of the object of measurement and excluding the object of measurement from the m objects of measurement.

In still another aspect of the invention, there is provided a transfer characteristics measuring method for measuring the transfer characteristics of each of n objects of measurement out of m (n≦m) objects of measurement, using the input signals being input to the m objects of measurement and the output signals from the objects of measurement in an acoustic reproduction environment for m channels having mutually differentiated respective spatial positions, the method comprising: an object of measurement selecting step of selecting an object of measurement according to the levels of the input signals of the m channels being supplied to the m objects of measurement; and a transfer characteristics computing and determining step of computing the transfer characteristics of the object of measurement selected in the object of measurement selecting step according to the input signal being supplied to the object of measurement and the output signal of the object of measurement corresponding to the input signal for each frequency point and adopting the transfer characteristics of the object of measurement in concurrence with computing and adopting the transfer characteristics of each of the objects of measurement selected by the object of measurement selecting step from the n objects of measurement for each frequency point.

In still another aspect of the invention, there is provided a transfer characteristics measuring computer program to be executed by a transfer characteristics measuring device for measuring the transfer characteristics of each of n objects of measurement out of m (n≦m) objects of measurement, using the input signals being input to the m objects of measurement and the output signals from the objects of measurement in an acoustic reproduction environment for m channels having mutually differentiated respective spatial positions, the computer program comprising: an object of measurement selecting step of for selecting an object of measurement out of the n objects of measurement according to the levels of the input signals of the m channels being supplied to the m objects of measurement; and a transfer characteristics computing and determining step of computing the transfer characteristics of the object of measurement selected in the object of measurement selecting step according to the input signal being supplied to the object of measurement and the output of the object of measurement corresponding to the input signal, determining adoption of the transfer characteristics of the object of measurement and excluding the object of measurement from the m objects of measurement.

In still another aspect of the invention, there is provided a transfer characteristics measuring computer program to be executed by a transfer characteristics measuring device for measuring the transfer characteristics of each of n objects of measurement out of m (n≦m) objects of measurement, using the input signals being input to the m objects of measurement and the output signals from the objects of measurement m an acoustic reproduction environment for m channels having mutually differentiated respective spatial positions, the computer program comprising: an object of measurement selecting step of selecting an object of measurement according to the levels of the input signals of the m channels being supplied to the m objects of measurement; and a transfer characteristics computing and determining step of computing the transfer characteristics of the object of measurement selected in the object of measurement selecting step according to the input signal being supplied to the object of measurement and the output signal of the object of measurement corresponding to the input signal for each frequency point and adopting the transfer characteristics of the object of measurement in concurrence with computing and adopting the transfer characteristics of each of the objects of measurement selected by the object of measurement selecting means from the n objects of measurement for each frequency point.

In still another aspect of the invention, there is provided an amplifier containing a transfer characteristics measuring device for measuring the transfer characteristics of each of n amplifiers out of m (n≦m) amplifiers, using the input signals being input to the m amplifiers and the output signals from the amplifiers in an acoustic reproduction environment for m channels having mutually differentiated respective spatial positions, the device comprising: an object of measurement selecting means for selecting an amplifiers out of the n objects of measurement according to the levels of the input signals of the m channels being supplied to the m amplifiers; and a transfer characteristics computing and determining means for computing the transfer characteristics of the amplifier selected by the object of measurement selecting means according to the input signal being supplied to the amplifier and the output signal of the amplifier corresponding to the input signal, determining adoption of the transfer characteristics of the amplifier and excluding the amplifier from the m amplifiers.

In a further aspect of the invention, there is provided an amplifier containing a transfer characteristics measuring device for measuring the transfer characteristics of each of n amplifiers out of m (n≦m) amplifiers, using the input signals being input to the m amplifiers and the output signals from the amplifiers in an acoustic reproduction environment for m channels having mutually differentiated respective spatial positions, the device comprising: an object of measurement selecting means for selecting an amplifier out of the n objects of measurement according to the levels of the input signals of the m channels being supplied to the m amplifiers; and a transfer characteristics computing and determining means for computing the transfer characteristics of the object of measurement selected by the object of measurement selecting means according to the input signal being supplied to the object of measurement and the output signal of the object of measurement corresponding to the input signal for each frequency point and adopting the transfer characteristics of the object of measurement in concurrence with computing and adopting the transfer characteristics of each of the objects of measurement selected by the object of measurement selecting means from the n objects of measurement for each frequency point.

Other objects and specific advantages of the present invention will become apparent from the detailed description given below by referring to the accompanying drawings that illustrate preferred embodiments of the invention.

BEST MODE FOR CARRYING OUT THE INVENTION

Now, the present invention will be described further by referring to the accompanying drawings that illustrate preferred embodiments of the invention. Firstly, an embodiment of transfer characteristics measuring device according to the invention that is adapted to measure the transfer characteristics of each of the objects of measurement in a 5-channel acoustic reproduction system in an acoustic reproduction environment for a multi-channel arrangement having mutually differentiated respective spatial positions. The transfer characteristics measuring device is adapted to measure the transfer characteristics of each of the objects of measurement such as amplifiers, using the music recorded in five channels or the sound of a movie film. The transfer characteristics measuring device will be described in grater detail hereinafter.

Firstly, the configuration of a 5-channel acoustic reproduction system will be described. The 5-channel acoustic reproduction system is a system for outputting the 5-channel audio signals reproduced from an optical disc where a 5-channel audio source is recorded and which typically conforms to the DVD standards from respective speakers that accommodate the 5-channel audio signals. The five channels include a front left channel L, a front center channel C, a front right channel R, a surround left channel LS and a surround right channel RS as arranged relative to listener.

Figure 1:
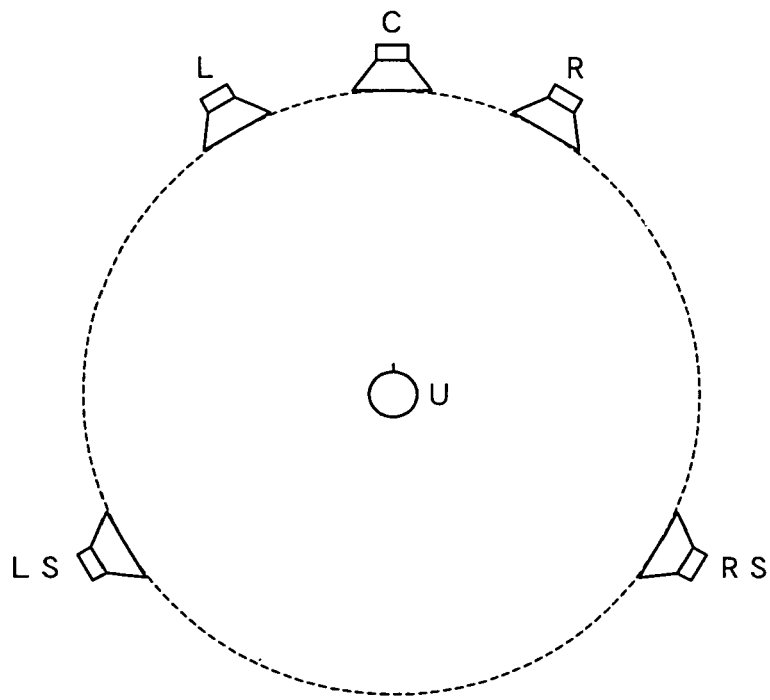
FIG. 1 is a schematic illustration of the positional arrangement of speakers of a 5-channel acoustic reproduction system.
Figure 2:
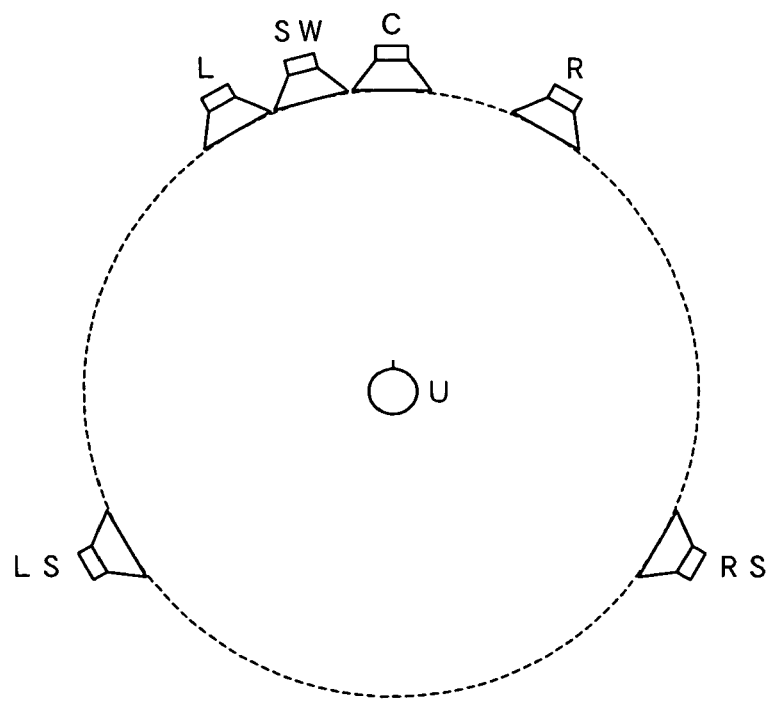
FIG. 2 is a schematic illustration of the positional arrangement of speakers of a 5.1-channel acoustic reproduction system.
Figure 3:
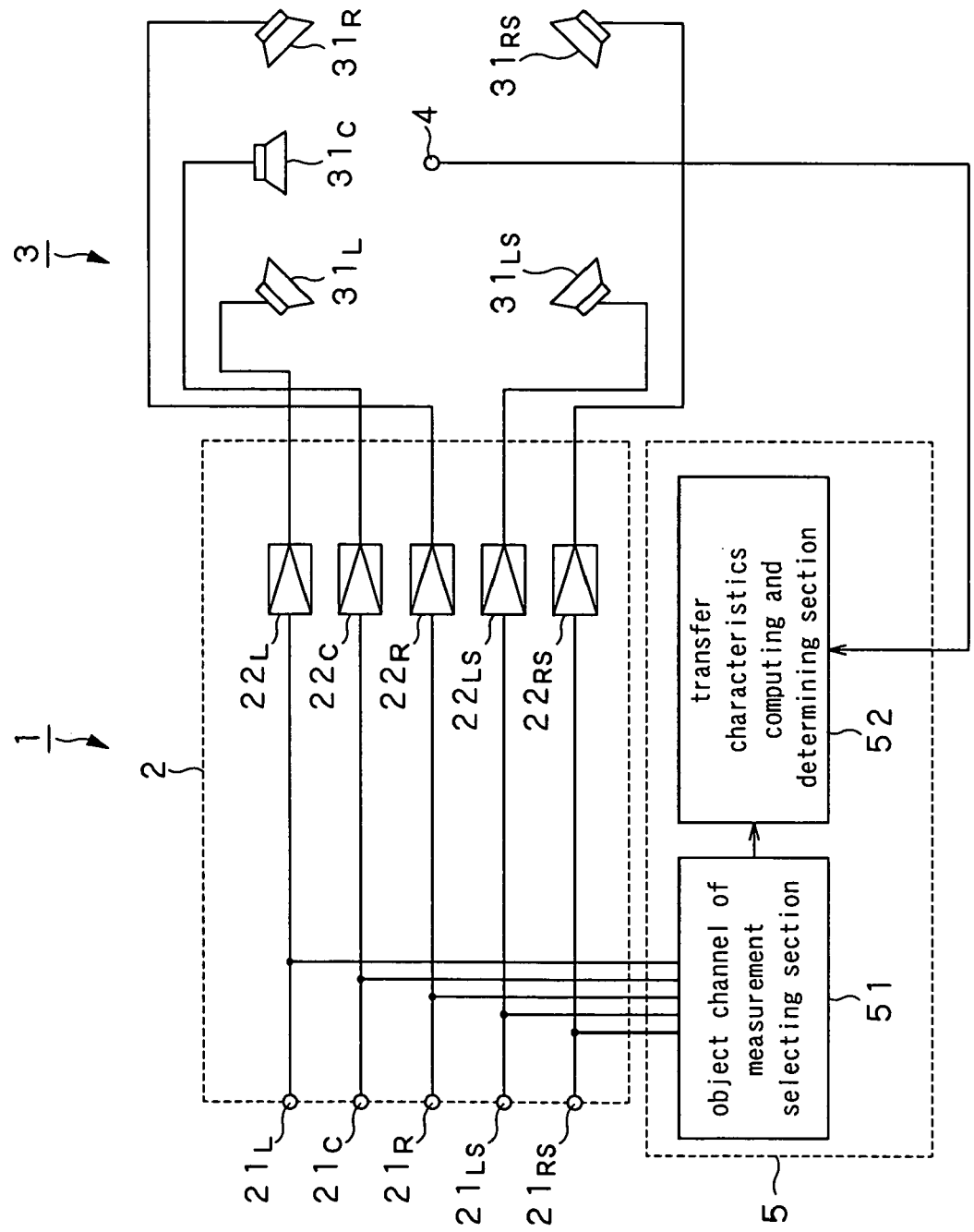
FIG. 3 is schematic illustration of the configuration of a 5-channel acoustic reproduction system.

As shown in FIG. 3, the 5-channel acoustic reproduction system 1 comprises an amplifier section 2 for amplifying the 5-channel analog audio signals supplied from an optical disc reproduction section (not shown), a speaker section 3 for outputting the analog audio signals amplified by the amplifier section 2, a microphone 4 for picking up the sounds output from the speakers of the speaker section 3, a transfer characteristics measuring device 5 for measuring the transfer characteristics of each of the amplifiers of the amplifier section 2.

The optical disc reproduction section (not shown) comprises an optical pickup for reading a recorded signal from an optical disc conforming to the DVD (digital versatile disc) standards, an RF amplifier for amplifying the signal read by the optical pickup, a servo/signal processing section for generating a servo signal from the signal amplified by the RF amplifier and processing the amplified signal for the purpose of detection of the recording pattern and error correction, a mechanism section for driving the optical pickup and the optical disc to revolve according to the servo signal generated by the servo/signal processing section and a decoder section for converting the signal processed by the servo/signal processing section into independent digital audio signals for the 5 channels. The audio reproduction section includes a D/A converter section for converting the independent digital audio signals for five channels obtained by the decoder section into respective analog audio signals for five channels.

The amplifier section 2 receives the analog audio signals for five channels from the D/A converter section respectively by way of the input terminals $21_L$, $21_C$, $21_R$, $21_{LS}$, $21_{RS}$ and amplifies them by the respective amplifiers $22_L$, $22_C$, $22_R$, $22_{LS}$, $22_{RS}$ in the amplifier section 2.

The speaker section 3 includes a speaker $31_L$ for the left channel, a speaker $31_C$ for the center channel, a speaker $31_R$ for the right channel, a speaker $31_{LS}$ for the left surround channel and a speaker $31_{RS}$ for the right surround channel and outputs the analog audio signals supplied from the amplifier section 2 for the channels.

The microphone 4 is a microphone for measurement arranged at the listening position of the listener. It picks up the music or the sound of a movie film recorded in five channels, converts it into an electric signal and supplies it to the transfer characteristics measuring device 5.

The transfer characteristics measuring device 5 comprises an object of measurement selecting section 51 for selecting one of the objects of measurement according to the levels of the input signals for five channels being supplied to the objects of measurement and a transfer characteristics computing and determining section 52 for computing and determining the transfer characteristics of the object of measurement selected by the object of measurement selecting section 51.

The object of measurement selecting section 51 selects one of the objects of measurement according to the levels of the input analog audio signals of the front left channel L, the front center channel C, the front right channel R, the surround left channel LS and the surround right channel RS before the signals are input to the respective amplifiers $22_L$, $22_C$, $22_R$, $22_{LS}$, $22_{RS}$ of the amplifier section 2.

Figure 4:
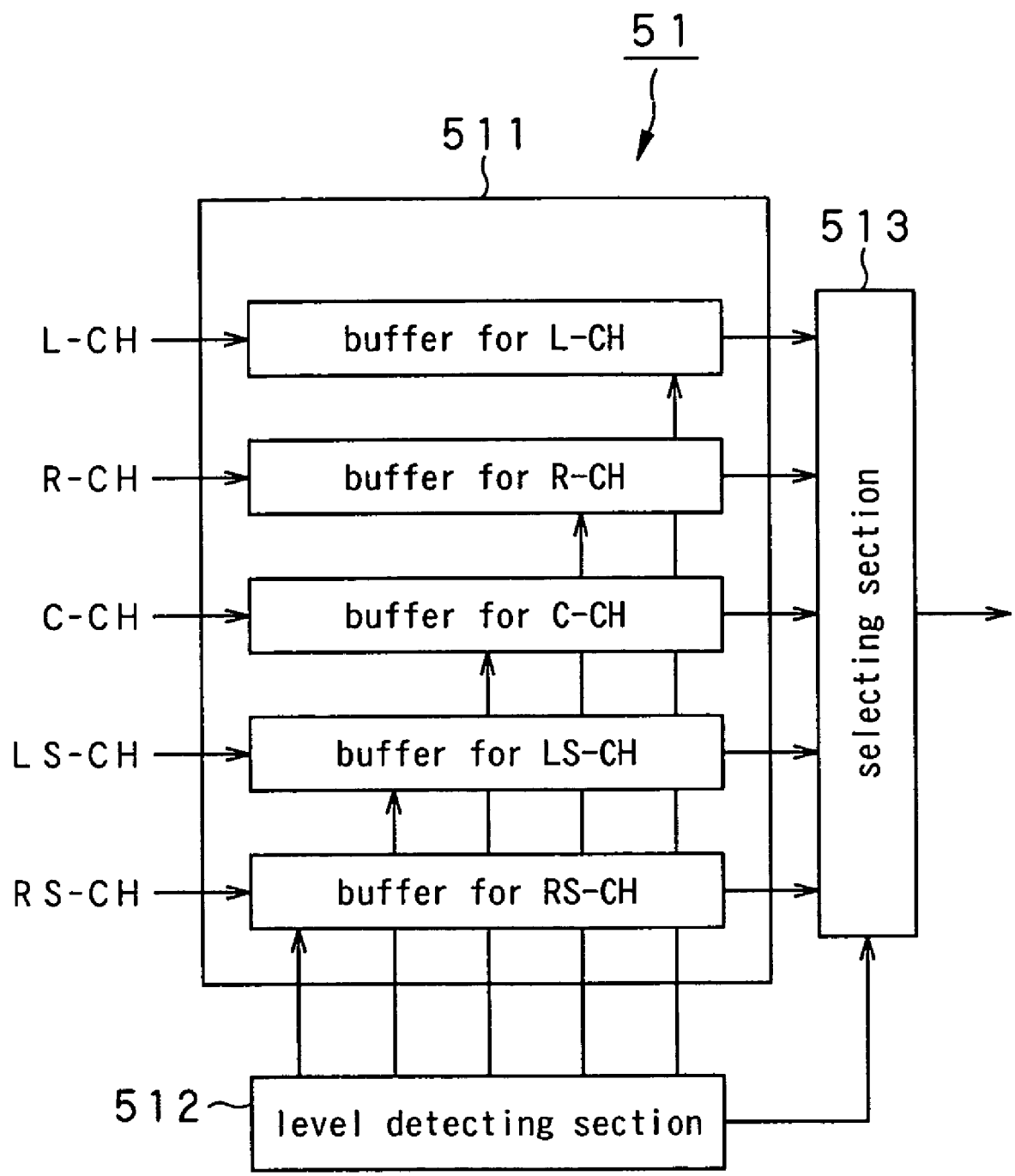
FIG. 4 is a detailed schematic illustration of the object of measurement selecting section of a transfer characteristics measuring device according to the invention.

As shown in FIG. 4, the object of measurement selecting section 51 includes an intake section 511 for taking in the input signals for five channels supplied respectively to the objects of measurements for five channels, a level detecting section 512 for detecting the levels of the input signals for five channels that are taken in by the intake section 511 and a selecting section 513 for selecting one of the objects of measurement according to the levels detected by the level detecting section 512.

The intake section 511 has a buffer memory for the L-CH, a buffer memory for the R-CH, a buffer memory for the C-CH channel, a buffer memory for the LS-CH channel and a buffer memory for the RS-CH, all of which have a capacity sufficient for taking in as many audio signals for the L channel, R channel, C channel, LS channel, RS channel converted by an A/D converter (not shown) into digital audio signals as the number of points P, which will be described in greater detail hereinafter.

The level detecting section 512 detects the levels of the data that the intake section 511 takes into the buffer memories and makes the selecting section 513 select the channel of the highest level. The level detecting section 512 detects the levels of the data on a peak to peak basis. It may transform the levels onto the frequency axis by He and measure them, using a frequency band of 500 Hz to 2 kHz, for example. It may measure the levels by normalization (RMS).

The level detecting section 512 checks the level of the audio signal taken in by the intake section 511 in this way for each channel and the selecting section 513 selects the channel whose audio signal shows a volume level higher than a predetermined level and the greatest level value of all the signals for the five channels as object of measurement channel.

The transfer characteristics computing and determining section 52 includes an orthogonal transformation section for performing an orthogonal transformation on the input signals supplied to the object of measurement, which is selected by the object of measurement selecting section 51, and the output signals of the object of measurement that correspond to the input signals, a power spectrum computing section for computing the power spectrums of the input signals and those of the output signals, using the spectrums of the input signals and those of the output signals obtained by the orthogonal transformation section, a cross spectrum computing section for multiplying the frequency component of the spectrum of each input signal by that of the spectrum of the corresponding output signal obtained by the orthogonal transformation section to computationally determine the cross spectrums, a spectrum average computing section for computing the average of the power spectrums of the input signals and the average of the power spectrums of the output signals computed by the power spectrum computing section and the average of the cross spectrums computed by the cross spectrum computing section, a transfer characteristics computing section for computing the transfer characteristics of the object of measurement from the averages of the power spectrums and the average of the cross spectrums computed by the spectrum average computing section, a coherence computing section for computing the value of the coherence from the average value of the power spectrums of the input signals, the average value of the power spectrums of the output signals and the average value of the cross spectrums computed by the spectrum average computing section and a transfer characteristics determining section for determining adoption of the transfer characteristics of the object of measurement computed by the transfer characteristics computing section on the basis of the coherence value computed by the coherence computing section and excluding the object of measurement from the plurality of objects of measurement, the number of which is equal to m.

Figure 5:
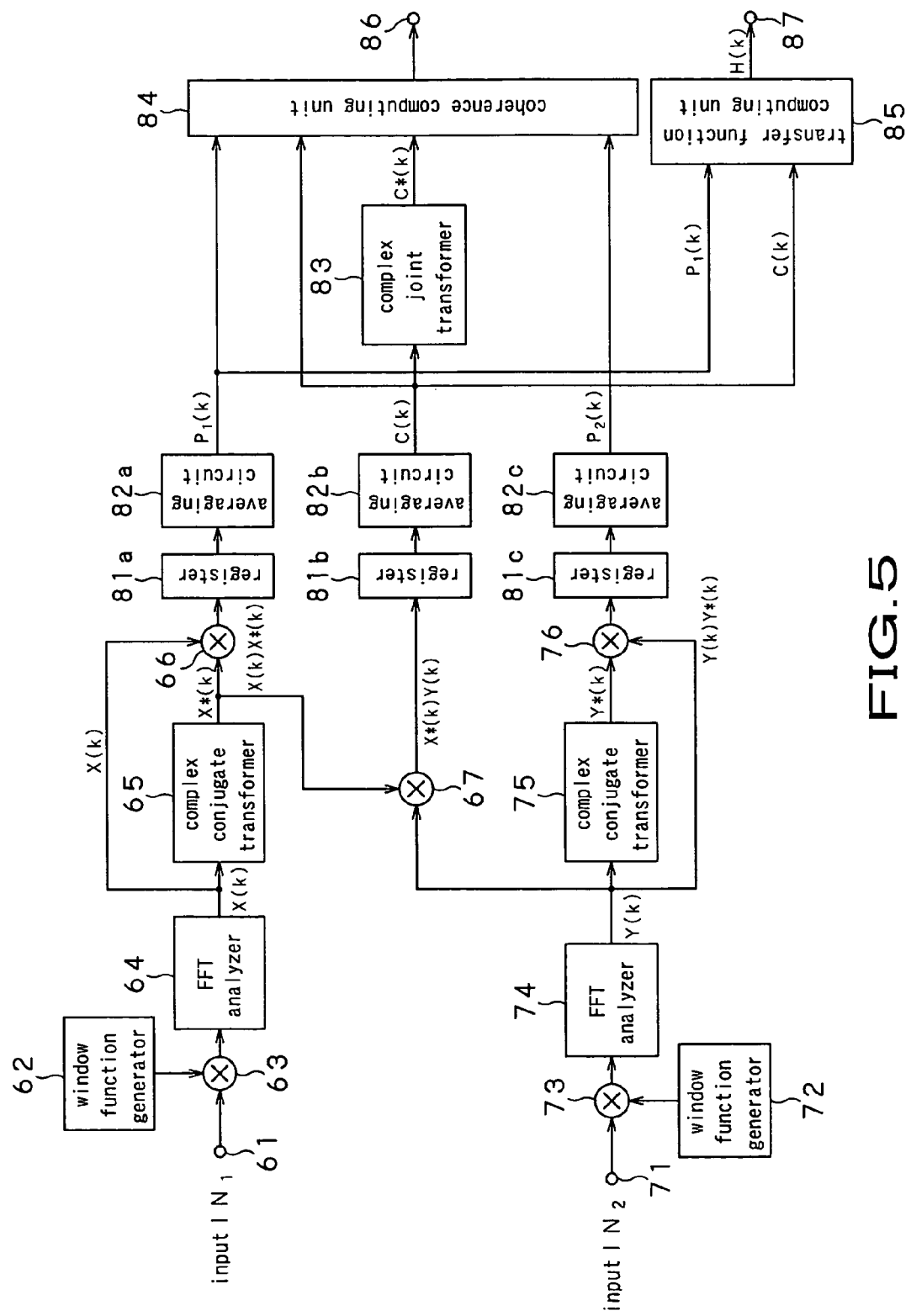
FIG. 5 is a detailed schematic illustration of the transfer characteristics computing section of the transfer characteristics measuring device according to the invention.

FIG. 5 illustrates a principal part of the transfer characteristics computing and determining section 52 in detail. Referring to FIG. 5, the input $IN_1$ obtained by digital conversion of the input signal to the object of measurement selected by the object of measurement selecting section 51 is supplied to input terminal 61. The input $IN_2$ obtained by digital conversion of the output signal of the object of measurement that corresponds to the input signal $IN_1$ is supplied to input terminal 71.

The number of samples of audio signal necessary for measuring the transfer characteristics is computed by using the number of points of fast Fourier transformation (FFT), which is a specific example of orthogonal transformation as will be described hereinafter and the numbers of times of averaging the power spectrums and the cross spectrums, which will also be described hereinafter. If, for example, the number of samples necessary for measuring the transfer characteristics is S, the number of points of fast Fourier transformation is P and the number of times of averaging is N, the number of samples S necessary for measuring the transfer characteristics is expressed by formula (1) below.

$$S = P \times N \tag{1}$$

More specifically, if the number of points P of fast Fourier transformation is 65,536 and the number of times of averaging N is 4, the number of samples is 65,536×4.

If the number of samples S needs to be computed accurately by using a relatively large number of points as in the case where the transfer characteristic that is selected as object of measurement is the frequency characteristic (transfer function), the number of points will be 65,536. However, when a detailed response is not required as in the case where the delay time is determined approximately from the impulse response, the number of points may be 1024 or 2048. The use of a large number of points is not required because it is only necessary to know the peak position of the impulse response. The number of times of averaging is not limited to 4 or 10. It may be 1, 2, 3, 5, 6, 7 or 9 depending on the transfer characteristic that is selected as object of measurement. Alternatively, the number of times of averaging may be 20, 25 or 30.

In this specific example, the signal data are taken out from the head thereof as signal of the input $IN_2$ and signal data of the correcting part are taken out from the head thereof by delaying it as signal of the input $IN_1$ to consider an occasion where the signal of the input $IN_2$ is delayed relative to the signal of the input $IN_1$ beyond the limit of the number of points of fast Fourier transformation.

The signal of the input $IN_1$ is output from the input terminal 61 to multiplier 63 and the signal of the input $IN_2$ that corresponds to the signal of the input $IN_1$ is output from the input terminal 71 to multiplier 73.

When the sound waveforms of a predetermined sample number are taken out, it is necessary to be careful so as not to give rise to a sharp change at the opposite ends of the taken out part and the original waveform has to be multiplied by a time window in the spectrum range in order to convolute the Fourier transformation of the window function for the spectrum of the signal, or obtain a weighted moving average. Thus, window functions that respectively correspond to the bands of the signals transmitted to the above multipliers 63, 73 are generated by window function generators 62, 72 and supplied to the multipliers 63, 73. As a result, the multipliers 63, 73 respectively multiply the signals of the bands by the window functions and the signals obtained by the multiplications are respectively sent to FFT analyzers 64, 74.

The FFT analyzers 64, 74 determine the frequency spectrum of the signal of the input $IN_1$ and the frequency spectrum of the signal of the input $IN_2$ by performing an operation of fast Fourier transformation on the signal data transmitted to them.

If the complex data of the spectrum of the input $IN_1$ is X(k), the complex data X(k) is sent to multiplier 66 and also to complex conjugate transformer 65. The complex conjugate transformer 65 transforms the complex data X(k) transmitted to it into complex conjugate data X*(k) and transmits the latter to the multiplier 66. The multiplier 66 multiplies the complex data X(k) from the FFT analyzer 64 by the complex conjugate data X*(k) to obtain the power spectrum X*(k) X(k) of the input $IN_1$. The power spectrum X*(k) X(k) is stored in register 81a.

Similarly, if the complex data of the spectrum of the input $IN_2$ is Y(k), the complex data Y(k) is sent to multiplier 76 and also to complex conjugate transformer 75. The complex conjugate transformer 75 transforms the complex data Y(k) transmitted to it into complex conjugate data Y*(k) and transmits the complex conjugate data Y*(k) to the multiplier 76. The multiplier 76 multiplies the complex data Y(k) from the FFT analyzer 74 by the complex conjugate data Y*(k) to obtain the power spectrum Y*(k) Y(k) of the input $IN_2$. The power spectrum Y*(k) Y(k) is stored in register 81c.

The complex conjugate data X*(k) of the spectrum of the input $IN_1$ output from the complex conjugate transformer 65 is multiplied by the complex data Y(k) of the spectrum of the input $IN_2$ output from the FFT analyzer 74 to obtain the cross spectrum X*(k) Y(k) by the multiplier 67, which cross spectrum X*(k) Y(k) is stored in register 81b.

In fact, there are provided as many registers 81a, 81b, 81c as the number equal to N that corresponds to the number of time of averaging N. In other words, N power spectrums X*(k) X(k) for N inputs $IN_1$, N power spectrums Y*(k) Y(k) for N inputs $IN_2$ and N cross spectrums X*(k) Y(k) are stored in the respective registers.

Subsequently, the N power spectrums X*(k) X(k) for the N inputs $IN_1$, the N cross spectrums X*(k) Y(k) and the N power spectrums Y*(k) Y(k) for the N inputs $IN_2$ that are stored in the respective registers 81a, 81b, 81c are transmitted respectively to averaging circuits 82a, 82b, 82c so that the average value $P_1(k)$ of the power spectrums of the inputs $IN_1$, the average value C(k) of the cross spectrums and the average value $P_2(k)$ of the power spectrums of the inputs $IN_2$ are computed.

Note that the average value $P_1(k)$ of the power spectrums of the inputs $IN_1$ is expressed by formula (2) below and the average value $P_2(k)$ of the power spectrums of the inputs $IN_2$ is expressed by formula (3) below, while the average value $C(k)$ of the cross spectrums is expressed by formula (4) below.

$$P_1(k) = \overline{X^*(k)X(k)} \quad (2)$$

$$P_2(k) = \overline{Y^*(k)Y(k)} \quad (3)$$

$$C(k) = \overline{X^*(k)Y(k)} \quad (4)$$

The average value $P_1(k)$ of the power spectrums of the inputs $IN_1$ and the average value $C(k)$ of the cross spectrums are transmitted to transfer function computing unit 85, which transfer function computing unit 85 computes the transfer function H(k) of the object of measurement. More specifically, the amplitude and the phase are computed as transfer function. The value of the transfer function is output from output terminal 87.

The transfer function H(k) including the amplitude and the phase is expressed by formula (5) below, while the transfer function H(k) including only the amplitude is expressed by formula (6) below.

$$H(k) = \frac{C(k)}{P_1(k)} \quad (5)$$

$$H(k) = \frac{P_2(k)}{P_1(k)} \quad (6)$$

The average value $P_1(k)$ of the power spectrums of the input $IN_1$, the average value $P_2(k)$ of the power spectrums of the inputs $IN_2$ and the average value $C(k)$ of the cross spectrums are sent to coherence computing unit 84.

The average value $C(k)$ of the cross spectrums determined by the averaging circuit 82b is sent to the complex conjugate transformer 83 to obtain the complex conjugate data $C^*(k)$ of the average value $C(k)$ of the cross spectrums, which complex conjugate data $C^*(k)$ of the average value $C(k)$ of the cross spectrums is also sent to the coherence computing unit 84.

The coherence computing unit 84 determines the coherence, or the interfering property of light waves that interfere with each other, using the average value $P_1(k)$ of the power spectrums of the input $IN_1$, the average value $P_2(k)$ of the power spectrums of the inputs $IN_2$, the average value $C(k)$ of the cross spectrums and the complex conjugate data $C^*(k)$ of the average value $C(k)$ of the cross spectrums. If the coherence is r, it is expressed by formula (7) below.

$$r = \frac{C^*(k)C(k)}{P_1(k)P_2(k)} \quad (7)$$

Figure 6:
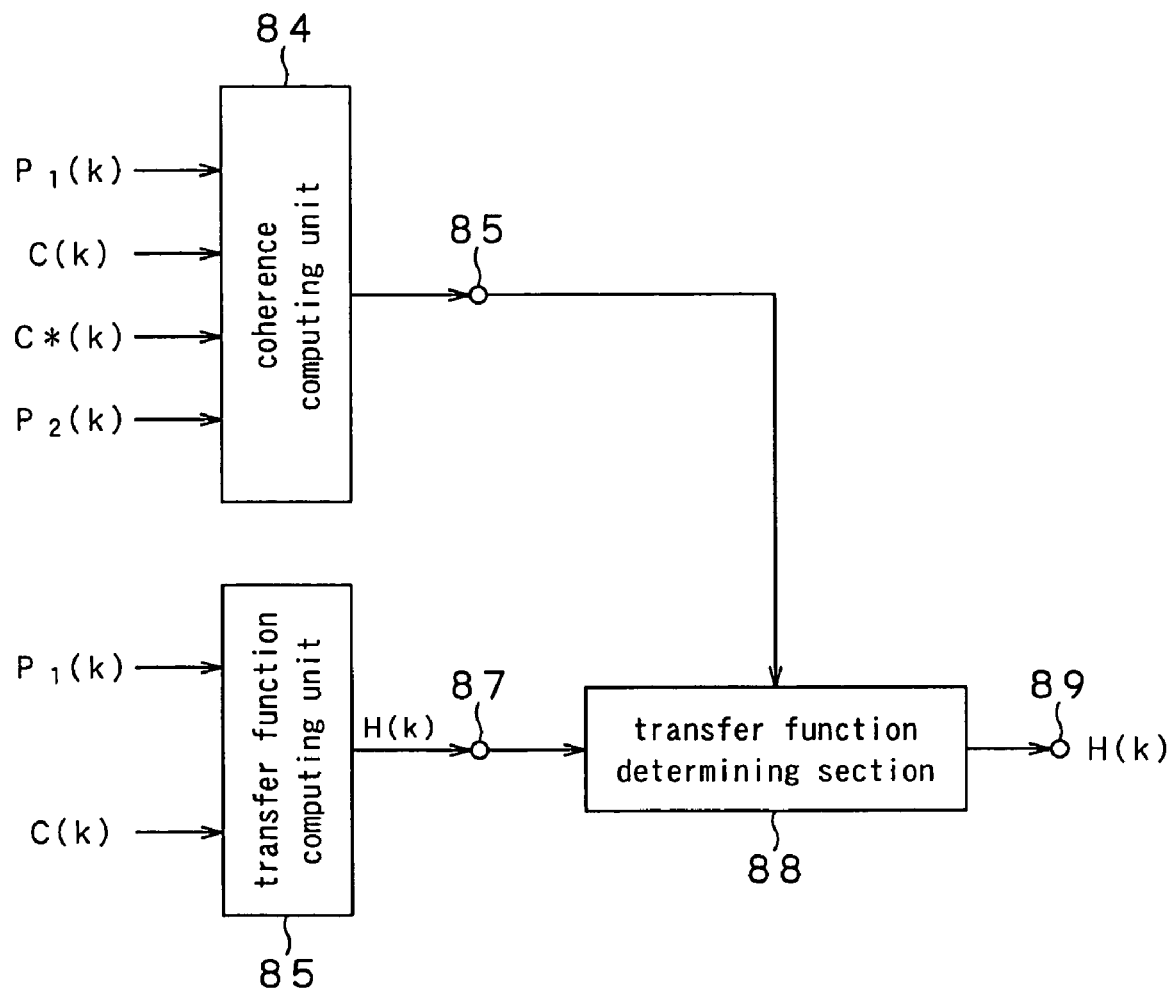
FIG. 6 is a detailed schematic illustration of the transfer characteristics determining section of the transfer characteristics measuring device according to the invention.

The coherence r that is computed by the coherence computing unit 84 is supplied to transfer function determining section 88 as shown in FIG. 6 by way of output terminal 85. The transfer function H(k) computed by the transfer function computing unit 84 is also supplied to the transfer function determining section 88.

The transfer function determining section 88 determines adoption of the value of the transfer function H(k) of an object of measurement according to the coherence value r and excludes the object of measurement from the objects of measurement of the five channels. For example, the coherence value r (of the transfer function) is adopted when it is not smaller than 0.8 and the channel is excluded from the objects of measurement by the transfer function determining section 88.

When sounds are reproduced simultaneously from a multi-channel arrangement that may involve the use of five channels, the coherence value r may be degraded and low if similar signal components exist with a similar sound volume level both in the channel that is the object of measurement and in some other channel so that the result of the measurement is disregarded and invalidated. On the other hand, the coherence value r may be significant and high if the sound levels of the channels other than the channel that is the object of measurement are low or if similar signal components do not exist so that the result of the measurement is adopted if the coherence value r is not lower than a predetermined value.

Now, a specific processing operation of the transfer characteristics measuring device 5 in the 5-channel acoustic reproduction system will be described by referring to FIG. 7.

Figure 7:
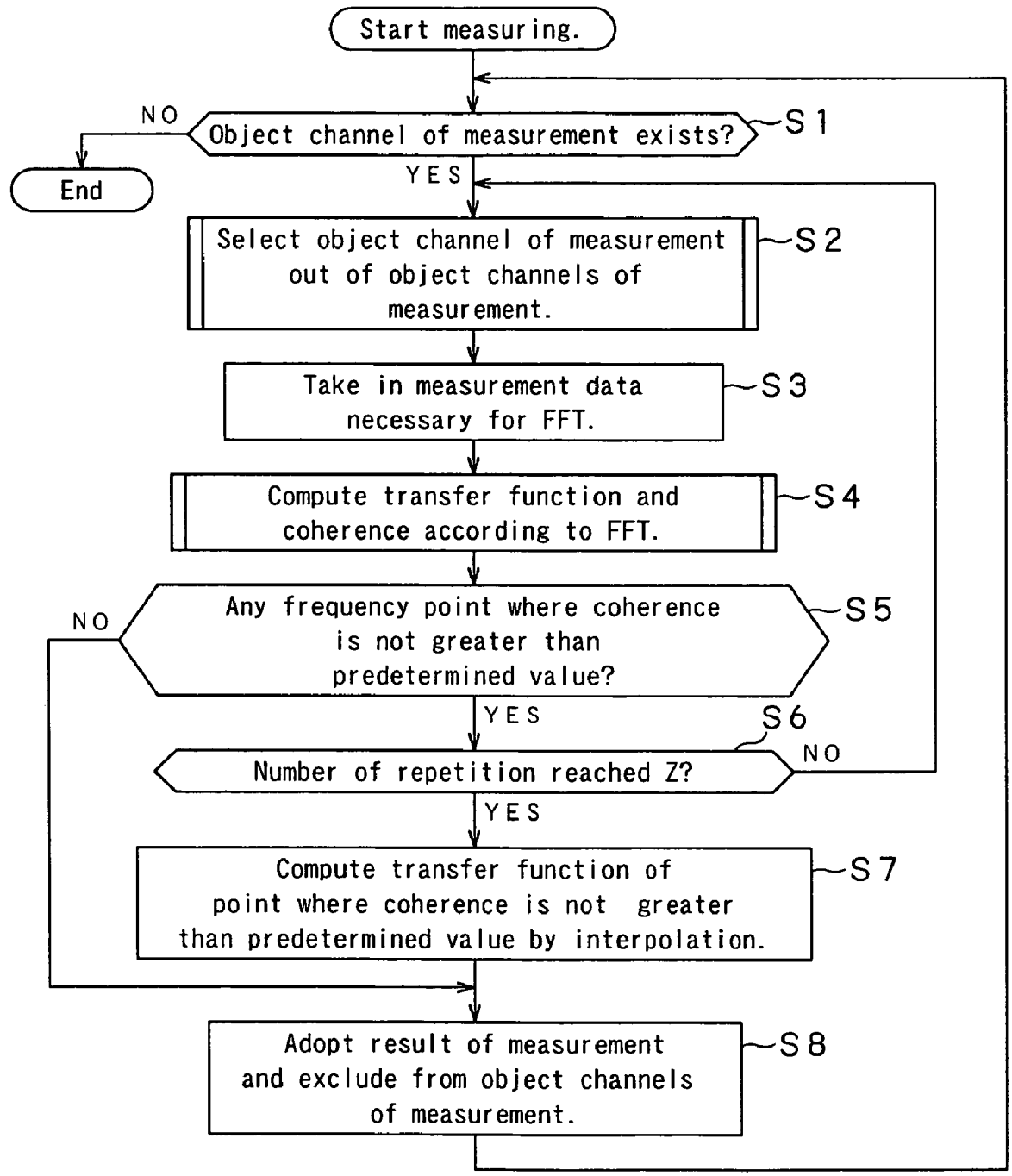
FIG. 7 is a flow chart of the processing operation of the transfer characteristics measuring device according to the invention.

Referring to FIG. 7, in Step S1, the object of measurement selecting section 51 checks if there are five objects of measurement for five channels that can be taken in by the intake section 511 or not. The processing operation proceeds to Step S2 if there are five objects of measurement for five channels.

In Step S2, the object of measurement selecting section 51 selects a channel as object of measurement out of the five channels that can equally be objects of measurement. In this letter of specification, the channel that is selected as object of measurement is referred to as object channel of measurement. There is a single object channel of measurement and one or more than one channels that are objects of measurement including the object channel of measurement. Immediately after the start of the flow of the processing operation, there are five channels that are objects of measurement. When the result of measurement of an object channel of measurement is adopted, the number of objects of measurement is reduced to four to exclude the object channel of measurement.

Figure 8:
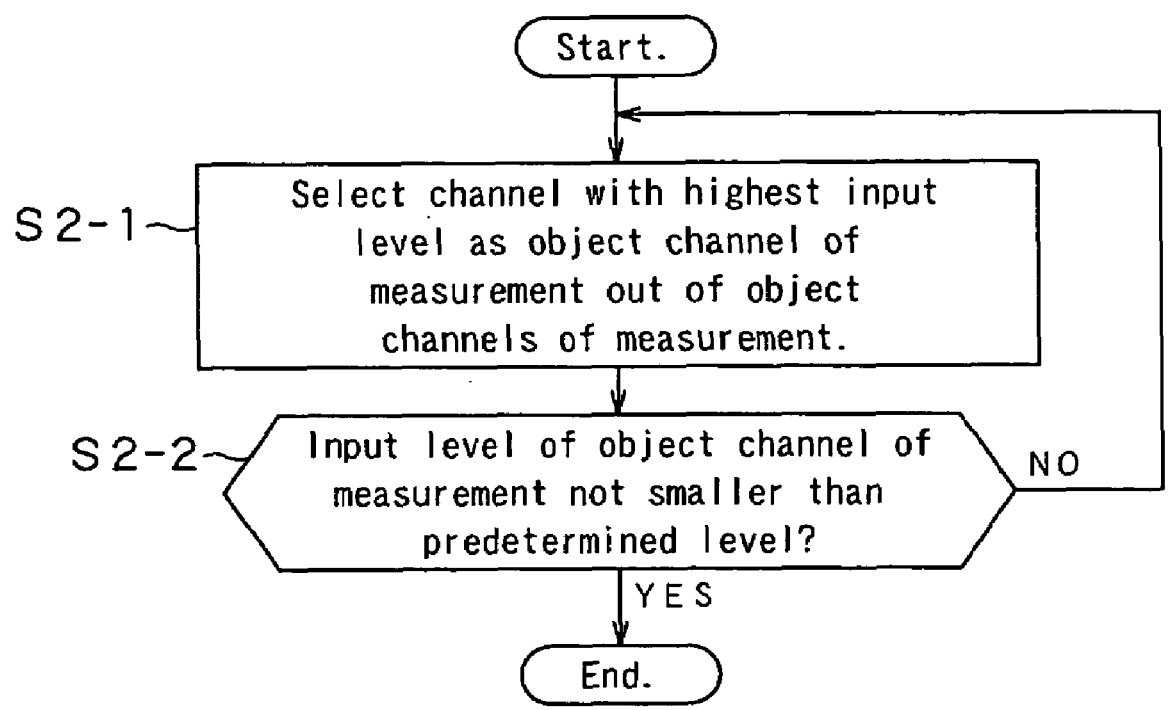
FIG. 8 is a flow chart of a first specific example of the processing operation of selecting an object channel of measurement out of the channels that are objects of measurement.

FIG. 8 is shows a processing operation of selecting an object channel of measurement in Step S2. Referring to FIG. 8, the level detecting section 512 of the object of measurement selecting section 51 detects the input levels of the five channels that are objects of measurement and taken in by the intake section 511 to the respective buffer memories and supplies channel information including information on the channel showing the highest input level to the selecting section 513. The selecting section 513 selects the channel showing the highest input level as object channel of measurement according to the channel information from the level detecting section 512 (Step S2-1). Then, in Step S2-2, the selecting section 513 checks if the input level of the selected object channel of measurement selected in Step S2-1 is not lower than a predetermined level or not. If the input level is not lower than the predetermined level, the selection of the object channel of measurement is finalized and the processing operation proceeds to Step S3 in FIG. 7. Other specific examples of the processing operation of selecting an object channel of measurement in Step S2 will be described hereinafter.

Returning to FIG. 7, Steps S3 through S8 are dedicated to measuring the input level of each of the channels. In Step S3, the transfer characteristics computing and determining section 52 takes in data necessary for FFT of input $IN_1$ and input $IN_2$. More specifically, data for the number of points=65,536 necessary for fast Fourier transformation is taken in. At this time, the microphone input signal is taken in from the head of the data of the input signal, while signal data of the correcting part of the original signal are taken in from the head thereof after delaying it by means of a delay circuit to consider an occasion where the microphone input signal is delayed relative to the original reproduction source signal beyond the limit of the number of points. Note that the delay time of the delay circuit is initially equal to 0.

Figure 9:
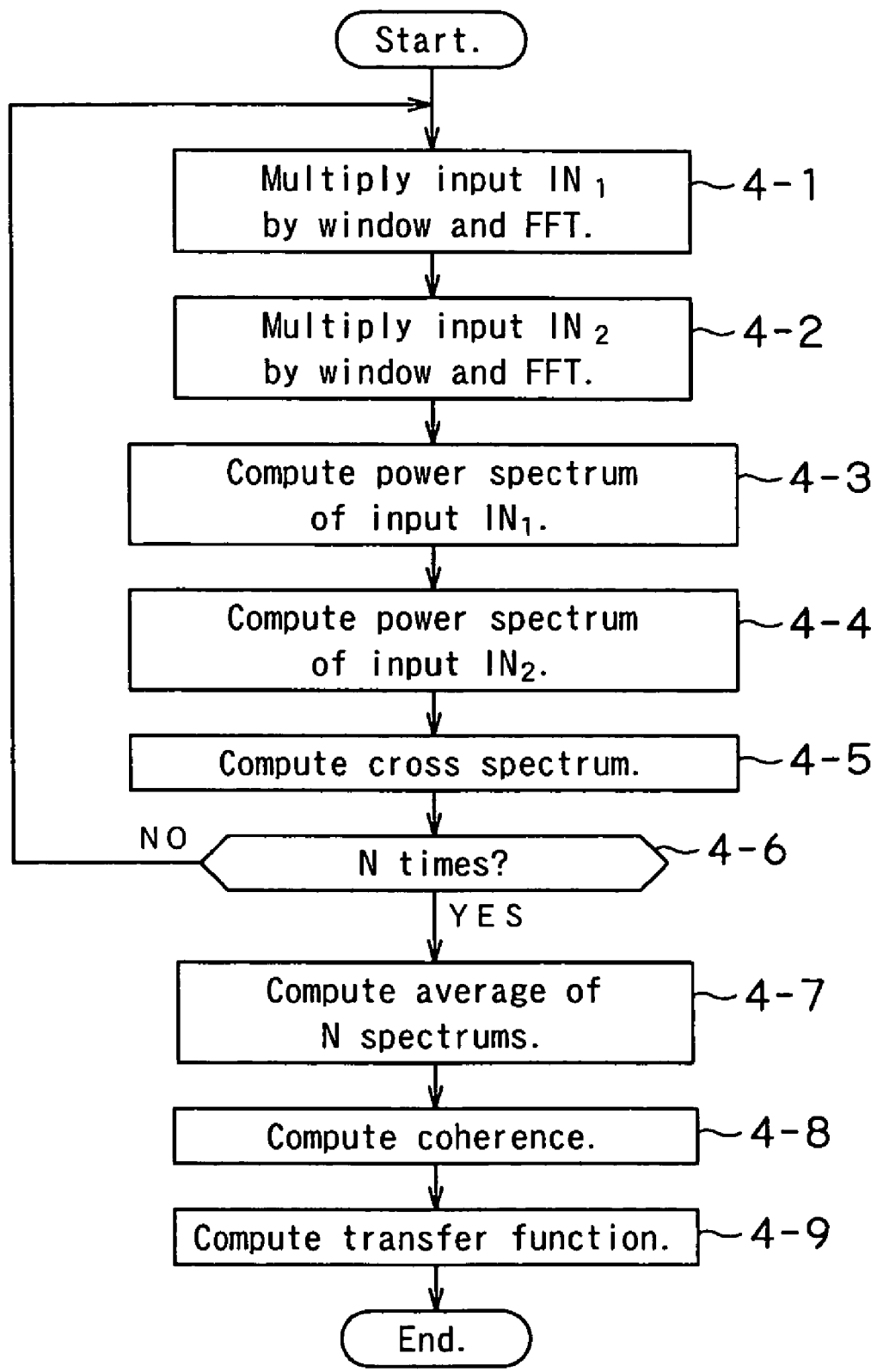
FIG. 9 is a flow chart of the processing operation of computing the transfer function and the coherence on the basis of FFT.

Thereafter, in Step S4, the transfer function and the coherence are computed according to the FFT analysis. FIG. 9 illustrates the subroutine for the operation of Step S4.

In Step S4-1, the original waveform of input $IN_1$ is multiplied by the time window and subsequently an FFT operation is conducted, and in Step S4-2, the original waveform of input $IN_2$ is multiplied by the time window and subsequently an FFT operation is conducted to obtain the frequency spectrums of inputs $IN_1$, $IN_2$.

In Step S4-3, power spectrum of input $IN_1$ for each frequency point is computed. In Step S44, power spectrum of input $IN_2$ for each frequency point is computed. Subsequently, in Step S4-5, cross spectrum is computed using the power spectrums of inputs $IN_1$, $IN_2$.

Thereafter, in Step S4-6, it is determined if the processing operation in Steps S4-1 through S4-5 has been repeated for N (=4) times necessary for averaging for each frequency point or not. If not, the operation returns to Step S4-1 to repeat the processing operation in Steps S4-1 through S4-5. If, on the other hand, the processing operation has been repeated for N (=4) times, it proceeds to Step S4-7, where the average value of the power spectrums of input $IN_1$, that of the power spectrum of input $IN_2$ and that of the cross spectrums are determined for each frequency point.

Then, in Step S4-8, the coherence, or the interfering property of light waves that interfere with each other, using the average value of the power spectrums of the input $IN_1$, that of the power spectrums of the input $IN_2$ and that of the cross spectrums. Then, in Step S49, the transfer function is computed. Thus, the subroutine of Step S4 is completed.

Then, in Step S5 in FIG. 7, the transfer function determining section 88 performs a reliability judging operation of determining if there is a frequency point where the coherence is not greater than 0.8 or not. In other words, it is checked if all the coherences obtained for all the frequency points as a result of measurement are not smaller than 0.8 or not. If it is judged in Step S5 that there is no frequency point (NO) where the coherence is not greater than 0.8 and hence the coherences of all the frequency points are not smaller than 0.8, the processing operation proceeds to Step S8, where the result of measurement is adopted and the selected channel is excluded from the channels that are objects of measurement. If, on the other hand, it is found that there is a frequency point where the coherence is not greater than 0.8 in the reliability judging operation of Step S5, the processing operation proceeds to Step S6. It may be needless to say that the transfer functions of the frequency points for which the coherences are found to be not smaller than 0.8 are stored in the respective internal or external temporary buffer memories by the transfer function determining section 88.

In Step S6, the transfer function determining section 88 checks if the number of times of repetition of the processing operation in Steps S2 through S5 has reached Z or not. The number of times of repetition is checked to raise the efficiency of measurement by determining the transfer function by means of interpolation or some other technique as will be described hereinafter without waiting indefinitely when the coherence is smaller than 0.8 for a certain frequency point. The value of Z will be selected so as to be equal to 5, 10, 15 or 20, for instance. The processing operation from Step S2 will be repeated if Z=10 is selected and the number of times of repetition is 9 in Step S6. The processing operation proceeds to Step S7 when the number of times of repetition gets to 10.

If, in Step S7, the number of times of repetition has reached Z but there is at least a frequency point for which the coherence is smaller than 0.8, the transfer function determining section 88 determines the transfer function of the frequency point by means of interpolation, for example, using data preceding data and succeeding data. When the processing operation returns to Step S2 because the number of times of repetition has not reached Z in Step S7, the computed transfer functions are averaged for the frequency points whose coherences are not smaller than 0.8.

The transfer functions for all the frequency points including the transfer function computed in Step S7 are adopted as results of measurement in Step S8 and excluded from the channels that are objects of measurement. After the processing operation in Step S8, the operation returns to Step S1 to start the operation of computing the transfer function for the next object channel of measurement.

While the processing operation from Step S2 is repeated when the number of times of repetition has not reached Z, e.g. 10, in Step S6, some other channel may be selected as object channel of measurement in the processing sequence of FIGS. 7 and 8.

For example, if the L channel is selected as object channel of measurement in Step S2 and the processing operation proceeds to Steps S3, to S4 and then to S5, where NO is obtained as a result of judgment to tell that there is at least a frequency point whose coherence is not greater than 0.8 for 10 kHz and above, the processing operation returns to Step S2 because the result of judgment is NO in Step S6. Then, the C channel may be selected as object channel of measurement in Step S2.

It may be needless to say that for the transfer function of any frequency point whose coherence has got to 0.8 in Step S5, the frequency point is stored in the temporary buffer memory as address for the L channel. In other words, the transfer function of a frequency point whose coherence for L channel is not smaller than 0.8 to make the transfer function reliable is stored in the temporary buffer memory for the L channel.

In the next measuring session for the C channel, the transfer function is stored in the temporary buffer memory for the C channel in Step S5 for determining the reliability.

Of course, some other channel such as the R channel, the L channel, or the LS channel may be selected in the course of measuring the transfer function at each and every frequency point of the C channel.

When the processing operation gets to Step S8, the transfer functions of the L channel or the C channel, for example, are stored in the respective temporary buffer memories that correspond to all the frequency points.

Now, the reliability judging operation of Step S5 will be described below by way of a specific example.

Figure 10:
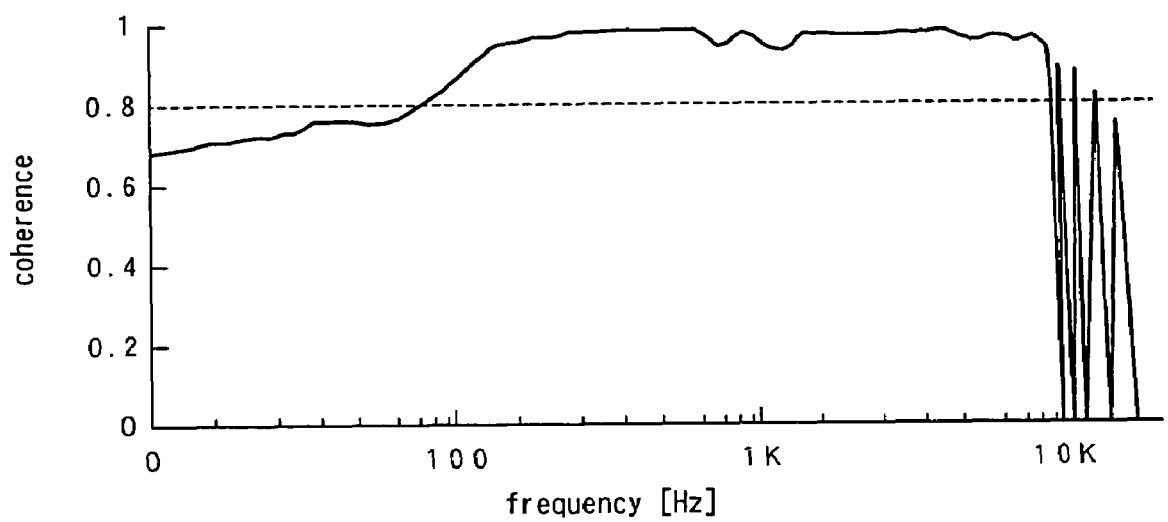
FIG. 10 is a graph illustrating the average coherence relative to each frequency point as example of characteristics.

The coherence computed (in Steps S4 through 7) by computing the average of N times for each spectrum is the average of coherences for each frequency point. FIG. 10 is a graph illustrating the average coherence for each frequency point as example of characteristics. In other words, FIG. 10 shows the average of the coherences obtained by using a number of times of N to be used for averaging.

As shown in FIG. 10, the coherence is smaller than 0.8 for frequencies smaller than 100 Hz. The coherence is not smaller than 0.8 from 100 Hz to 10 kHz but it becomes smaller than 0.8 again beyond 10 kHz.

Thus, the transfer function determining section 88 judges that there is at least a frequency point where the coherence is not greater than a predetermined value in the reliability judgment of Step S5 and proceeds to Step S6.

Then, the processing operation in Steps S2 through S5 is repeated in Step S6 until the number of repetition Z gets to 10. If there is at least a frequency point where the coherence is smaller than 0.8 in a frequency range below 100 Hz or above 10 kHz, the transfer functions for those frequency ranges are determined by means of interpolation or some other technique.

Figure 11:
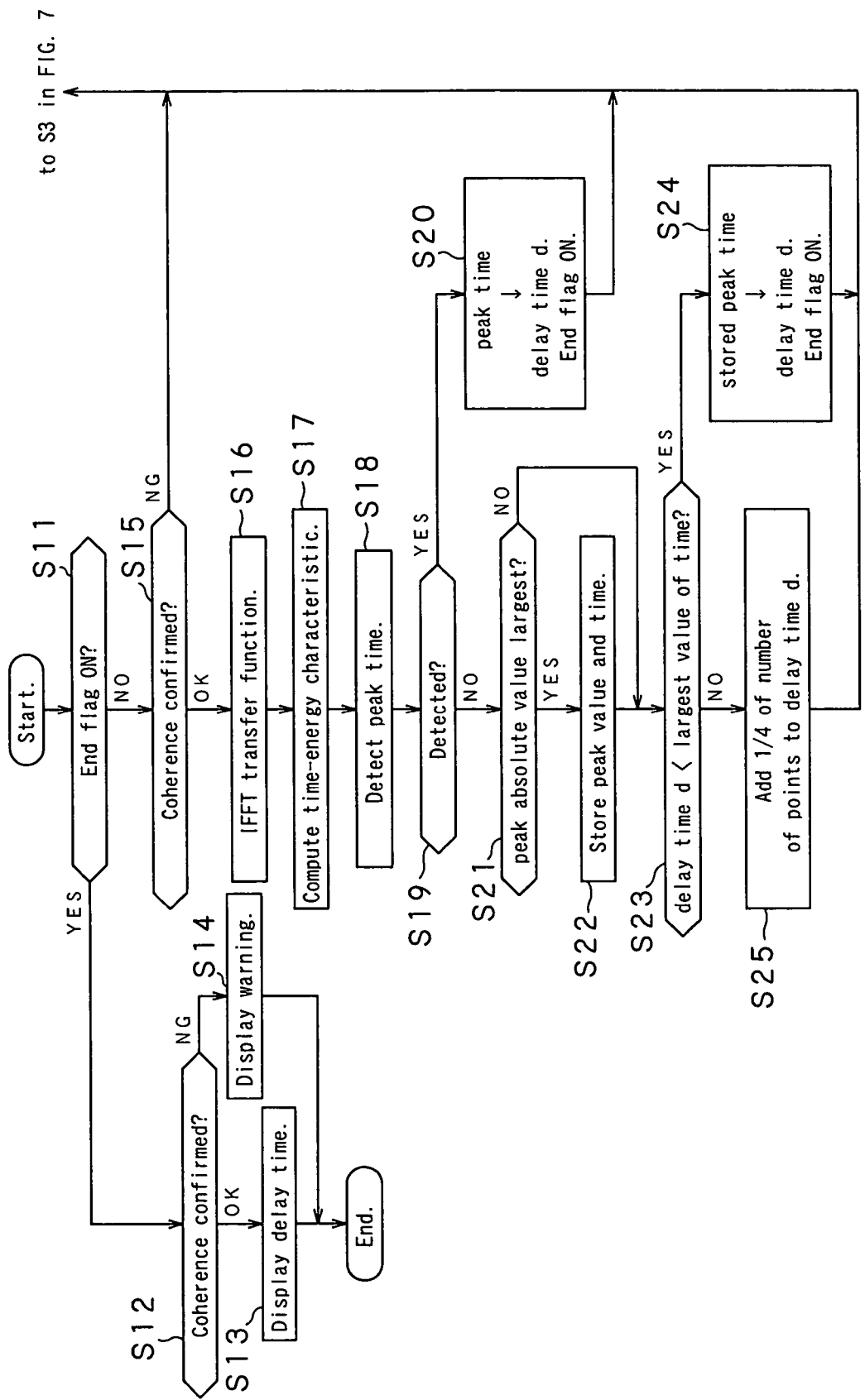
FIG. 11 is a flow chart of the processing operation of measuring the delay time.

The transfer functions determined in Step S4 in FIG. 9, or in Step S49 in FIG. 11 to be more accurate, are also used for computing other transfer characteristics at the listening position of the 5-channel acoustic reproduction system. FIG. 11 is a flow chart of the sequence of the processing operation of measuring the delay time. The sequence of operation of FIG. 11 comes after the processing operation in Step S4-9 in FIG. 9, which shows the subroutine of-Step S4 in FIG. 7.

Firstly in Step 511, it is judged if the end flag is ON or not. The end flag is made ON in a processing operation that will be described hereinafter.

If it is judged that the end flag is not ON, it means that the measurement of the delay time is not completed and hence the processing operation proceeds to Step S15.

In Step S15, the average of the coherences computed for each frequency point is determined and, if the average value is smaller than a predetermined value, the processing operation returns to Step S3 shown in FIG. 7 to take in inputs $IN_1$, $IN_2$ and the operation down to the computation of coherence is repeated.

If the average value of the coherences is not smaller than the predetermined value for each frequency point, the transfer function computed in Step S49 is subjected to inverse fast Fourier transformation (IFFT) in Step S16 to obtain the impulse response h(t) of the object of measurement. Additionally, the peak value of the data from the beginning of the impulse response h(t) to ½ of the number of points of FFT is detected.

Subsequently, the processing operation proceeds to Step S17 for the operation of computing the time-energy characteristic. More specifically, the data of the impulse response h(t) is converted into a decibel (dB) value. At this time, the decibel value D is obtained by formula (8) below.

$$D=20 \log |h(t)| \quad (8)$$

Then, in Step S18, the time tPeak where the peak value is detected is detected. The value that is greatest among all the values obtained by converting into decibel values, or the value that is not smaller than a predetermined level, −100 dB for instance, and greater than the average of all the other values by a predetermined value, 40 dB for instance, is regarded as peak value. If the peak value is expressed by DPeak, it is expressed by formula (9) below.

$$DPeak=20 \log |h(tPeak)| \quad (9)$$

Thereafter, in Step S19, it is determined if the time where a peak value exists is detected or not. If it is determined that the time where a peak value exists is detected as a result of the processing operation in Step S19, the processing operation proceeds to Step S20, where the detected time for the peak value is selected as delay time for the object of measurement. Then, the end flag is made ON.

If, on the other hand, the obtained data does not satisfy the requirements of being a peak, the processing operation proceeds to Step S19, where is it judged that the time where a peak value exists is not detected.

Therefore, the processing operation proceeds to Step S21, where it is judged if the absolute value of the detected peak value is the maximum value of the peak values that have been obtained or not. If it is determined that the absolute value of the detected peak value is the maximum value of the peak values, the processing operation proceeds to Step S22 to store the peak value and the time of the peak value, the processing operation then proceeds to Step S23. If, on the other hand, it is determined in Step S21 that the absolute value of the detected peak value is not the maximum value of the peak values, the processing operation proceeds to Step S23.

In Step S23, the current delay time d of the delay circuit and the time of the stored maximum value are compared. If it is determined that the delay time d is greater than the maximum value as a result of the comparison, the processing operation proceeds to Step S25 to add ¼ of the number of points obtained as a result of FFT is added to the current delay time d and the processing operation returns to Step S3, where the value obtained by adding ¼ of the number of points that is obtained as a result of FFT to the current delay time d is selected as delay time d of the delay circuit and inputs $IN_1$, $IN_2$ are taken in for the processing operation down to the computation of the transfer function and the coherence in Step S4.

In this way, the delay time d of the delay circuit is increased by ¼ of the number of points that is obtained as a result of FFT until a peak value is detected and inputs $IN_1$, $IN_2$ are taken in for computing the impulse response.

If, on the other hand, that the maximum value is greater than the delay time as a result of comparison in Step S23, the processing operation proceeds to Step S24, where the peak value stored in Step S22 is selected as delay time and the end flag is made ON. Then, the processing operation returns to Step S3, where the delay time from the delay circuit of input $IN_1$ is selected as delay time d and inputs $IN_1$, $IN_2$ are taken in for the processing operation down to the computation of the transfer function and the coherence in Step S4.

If no peak value is detected to the limit of measurement, the end flag is made ON and the largest peak value among the peak values that have been detected is selected as delay time d of input $IN_1$. Then, inputs $IN_1$, $IN_2$ are taken in once again for the processing operation down for computing the impulse response.

The measurement of the delay time is made to progress in this way and, once it is determined in Step S11 that the end flag is ON, the processing operation proceeds to Step S12, where it is determined if the average value of the coherences for each frequency point is not smaller than the predetermined value or not.

If, as a result, it is confirmed that the average value of the coherences is not smaller than the predetermined value, the processing operation proceeds to Step S13, where the delay time d of input $IN_1$ that is selected for the delay circuit is determined as the result of the measurement and displayed on a display device to complete the operation of measuring the delay time. If, on the other hand, it is confirmed that the average value of the coherences is smaller than the predetermined value, a warning message is displayed on the display device in Step S14 to complete the operation of measuring the delay time.

As described above, a transfer characteristics measuring device according to the invention picks up the audio signal for 5 channels from a 5-channel audio source reproduced by a 5-channel acoustic reproduction system at the listening position by means of a microphone 4 and automatically measures the transfer characteristics of each channel, while allowing normal multi-channel reproduction to proceed.

Of the transfer characteristics measured by a transfer characteristics measuring device according to the invention, the amplitude and the phase that relate to the transfer function (frequency characteristics), the delay time and the propagation time are displayed on the display section. Additionally, the transfer characteristics measuring device can be used to update the parameters of each of the amplifiers of the amplifier section that are objects of measurement and regulate each channel according to the transfer characteristics.

Figure 12:
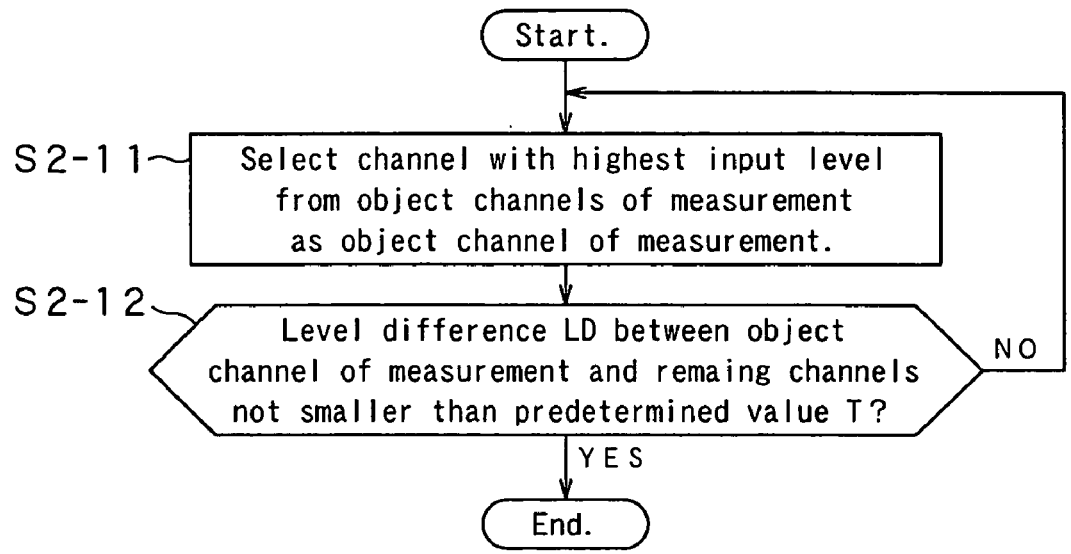
FIG. 12 is a flow chart of a second specific example of the processing operation of selecting an object channel of measurement out of the channels that are objects of measurement.

The processing operation of selecting an object channel of measurement out of a plurality of object channels of measurement of a transfer characteristics measuring device according to the invention illustrated in FIG. 7 as Step S2 may be replaced by a processing operation illustrated in FIG. 12.

The level detecting section 512 of the object of measurement selecting section 51 detects the input levels of the five channels that are objects of measurement and taken in by the intake section 511 to the respective buffer memories and supplies channel information including information on the channel showing the highest input level to the selecting section 513. The selecting section 513 selects the channel showing the highest input level as object channel of measurement according to the channel information from the level detecting section 512 (Step S2-1). Then, in Step S2-12, the selecting section 513 checks if the level difference LD between the input level of the object channel of measurement selected in Step S2-11 and any of the input levels of the remaining object channels of measurement is not smaller than a predetermined value T or not. If the difference is not smaller than the predetermined value T, the selecting section 513 confirms the selection of the object channel of measurement and the processing operation proceeds to Step S3 in FIG. 7. The predetermined value T may be 10 dB, 20 dB or 30 dB.

Figure 13:
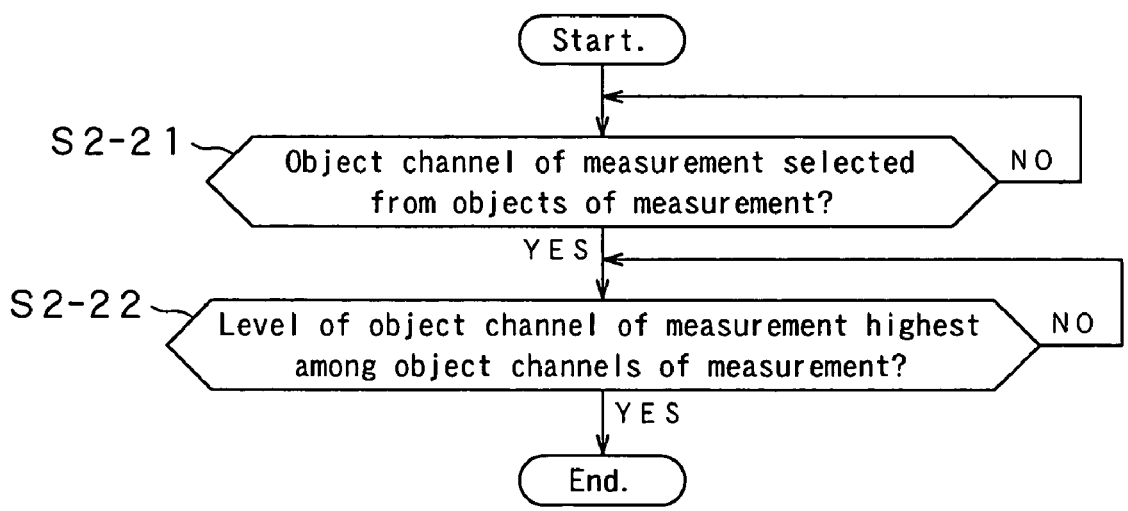
FIG. 13 is a flow chart of a third specific example of the processing operation of selecting an object channel of measurement out of the channels that are objects of measurement.

The processing operation illustrated in FIG. 7 as Step S2 described above may be replaced by a processing operation illustrated in FIG. 13. According to the flow chart of FIG. 13, an object channel of measurement is selected when the level of the candidate channel selected by the user becomes highest in the object channels of measurement. Thus, the remaining part of the processing operation in FIG. 7 also differs from the above-described one.

If it is determined in Step S1 that there are channels to be taken in as objects of measurement and an object channel of measurement is selected out of the objects of measurement by the user in Step S2-21, the level detecting section checks in Step S2-22 if the level of the object channel of measurement is highest among the levels of the object channels of measurement. If it is determined that the level of the object channel of measurement is highest among the levels of the object channels of measurement, the processing operation proceeds to Step S3 and on as illustrated in FIG. 7.

If it is determined in Step S6 that the number of times of repetition is smaller than Z, the operation of measuring the transfer function of the object channel of measurement selected by the user firstly in Step S2 is repeated.

For example, if the L channel is selected as object channel of measurement in Step S2, the L channel remains as object channel of measurement while the processing operation in Steps S2 through S6 is repeated for 2, 3, 4, . . . , 9 times.

Now, another embodiment of the present invention will be described. This embodiment of the invention is a transfer characteristics measuring device for measuring the transfer characteristics of an object of measurement selected from a 5.1-channel acoustic reproduction system comprising five channels including an L channel, a C channel, an R channel, an LS channel, which are described above, and an RS channel and a sub-woofer (SW) channel for low frequency enhancement (LFE). Thus, the embodiment measures the transfer characteristics of each of the objects of measurement, which may be the speakers, using the sound of a piece of music or that of a movie film recorded on 5.1 channels.

A 5.1-channel acoustic reproduction system is a system adapted to output the 5.1-channel audio signals reproduced from an optical disc where a 5.1-channel audio source is recorded and which typically conforms to the DVD standards from respective speakers that accommodate the 5.1-channel audio signals.

Figure 14:
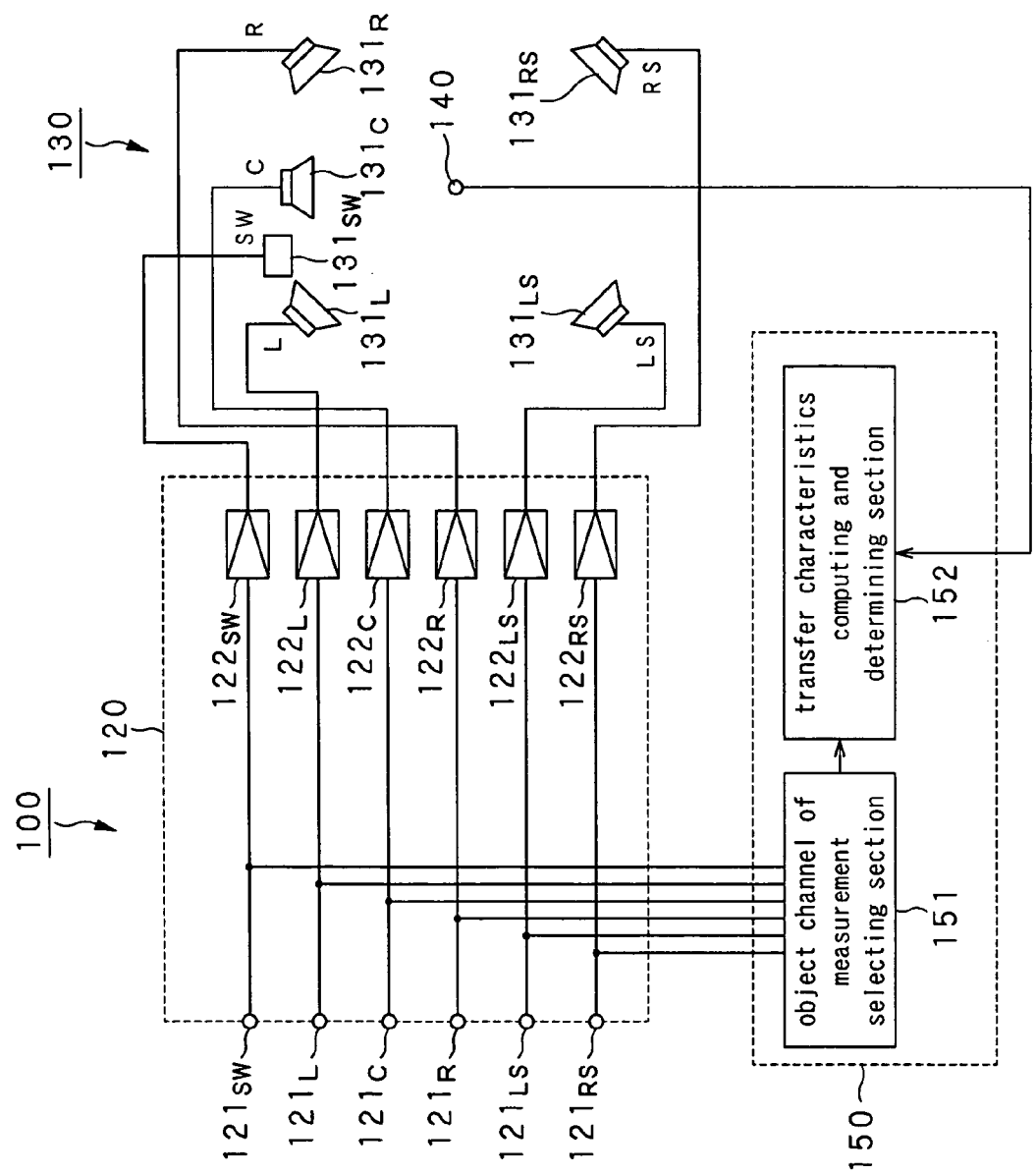
FIG. 14 is a schematic illustration of the configuration of a 5.1-channel acoustic reproduction system.

Thus, as shown in FIG. 14, the 5.1-channel acoustic reproduction system comprises an amplifier section 120 for amplifying the 5.1-channel analog audio signals supplied from an optical disc reproduction section (not shown), a speaker section 130 for outputting the analog audio signals amplified by the amplifier section 120, a microphone 140 for picking up the sounds output from the speakers of the speaker section 130, a transfer characteristics measuring device 150.

The amplifier section 120 receives the analog audio signals for 5.1 channels from the D/A converter section respectively by way of the input terminals 121SW, 121L, 121C, 121R, 121LS, 121RS and amplifies them by the respective amplifiers 122SW, 122L, 122C, 122R, 122LS, 122RS in the amplifier section 120.

The speaker section 130 includes a speaker 131SW for the sub-woofer channel, a speaker 131L for the left channel, a speaker 131C for the center channel, a speaker 131R for the right channel, a speaker 131LS for the left surround channel and a speaker 131RS for the right surround channel and outputs the analog audio signals supplied from the amplifier section 120 for the channels.

The microphone 140 is a microphone for measurement arranged at the listening position of the listener. It picks up the music or the sound of a movie film recorded in 5.1 channels, converts it into an electric signal and supplies it to the transfer characteristics measuring device 150.

The transfer characteristics measuring device 150 includes an object of measurement selecting section 151 for selecting one of the objects of measurement according to the levels of the input signals for 5.1 channels being supplied to the objects of measurement and a transfer characteristics computing and determining section 152 for computing and determining the transfer characteristics of the object of measurement selected by the object of measurement selecting section 151.

Since the sub-woofer is normally in charge of a very low band lower than 120 Hz. Therefore, the band that is lower than 120 Hz, which the sub-woofer can reproduce, can be excluded from the operation of computing the transfer characteristics of the remaining five channels.

As the object of measurement selecting section 151 detects that a sub-woofer is found in the system, the transfer characteristics computing and determining section 152 of the transfer characteristics measuring device 150 can exclude the very low frequency band from the operation of computing the transfer characteristics of the remaining five channels. As a result, the above described processing operation in Steps S7 and S8 in FIG. 7 can be omitted.

Otherwise, the sequence of the processing operation illustrated in FIGS. 4 through 13 is applicable to the transfer characteristics measuring device 150.

Thus, the transfer characteristics measuring device according to the invention picks up the audio signal for 5.1 channels from a 5.1-channel audio source reproduced by a 5.1-channel acoustic reproduction system at the listening position by means of a microphone 140 and automatically measures the transfer characteristics of each channel, while allowing normal multi-channel reproduction to proceed.

Of the transfer characteristics measured by the transfer characteristic measuring device, the amplitude and the phase that relate to the transfer function (frequency characteristics), the delay time and the propagation time are displayed on the display section. Additionally, the transfer characteristics measuring device can be used to update the parameters of each of the amplifiers of the amplifier section that are objects of measurement and regulate each channel according to the transfer characteristics.

In any transfer characteristics measuring devices according to the invention as described above, all the object channels of measurement may be selected for measurement or only the channels specified by the user may be selected for measurement. For example, the front L channel, the front C channel and the front R channel may be selected for measurement.

In other words, out of the objects of measurement of m=5 or 5.1, n=3 or three object channels of measurement may be selected. m may be equal to 2, 3, 4 or 6, 7, . . . n may also be equal to 2, 3, 4 or 6, 7, . . . so long as it is not greater than m.

A small value may be selected for the reference value of Z for the number of repetition that is used in the checking operation of Step S6 shown in FIG. 7 when the transfer functions of the front L channel, the front C channel and the front R channel are observed first out of the five channels and those of the LS channel and the RS channel are observed thereafter. For example, it may be reduced from 10 to 6 or 7.

It is possible to realize a transfer characteristics measuring device according to the invention by means of a personal computer by making the CPU of the personal computer execute a transfer characteristics measuring computer program prepared on the basis of the sequence of processing operation illustrated in FIGS. 7 through 9, 12 and 13.

Figure 15:
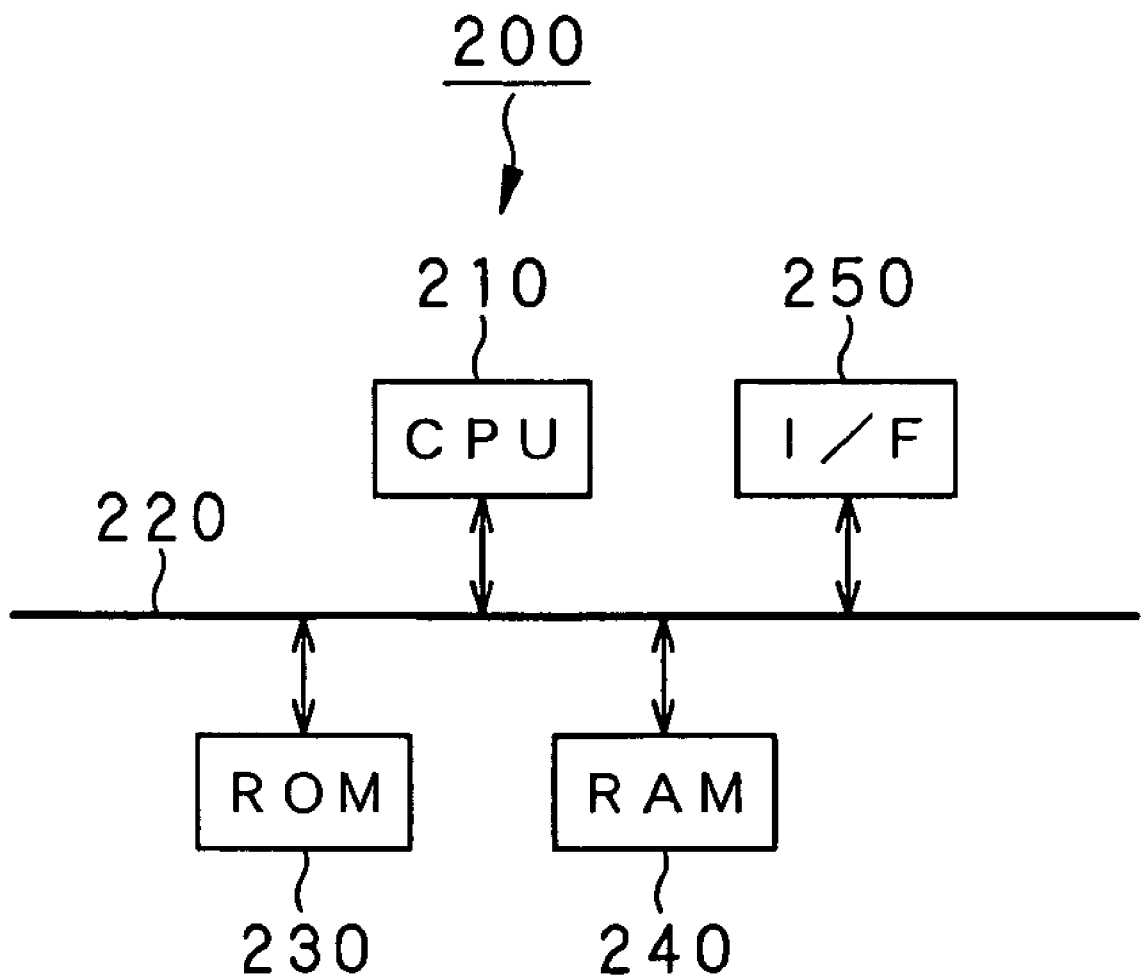
FIG. 15 is a schematic illustration of the configuration of a personal computer.

Referring to FIG. 15, the CPU 210 of personal computer 200 is connected to a ROM 230 storing such a transfer characteristics measuring computer program, a RAM 240 that provides a program work area, an amplifier section and an I/F 250, which operates as interface between a microphone and inputs $IN_1$, $IN_2$, by way of an internal bus 220.

The personal computer 200 reads out the transfer characteristics measuring computer program from the ROM 230 and executes it, using the RAM 240 as work memory, to operate as transfer characteristics measuring device 1 or 100.

The personal computer 200 displays the characteristics including the amplitude and the phase obtained by means of the transfer function (frequency characteristics), the delay time, the propagation time and the like on the display section thereof. The transfer function of each amplifier of the amplifier section that is an object of measurement is used for updating the parameters of the amplifier.

The transfer function, the delay time and the propagation time are listed as examples of the transfer characteristics to be observed by a transfer characteristics measuring device according to the invention.

The characteristics such as the amplitude and the phase obtained by means of the transfer function (frequency characteristics) of the transfer characteristics that are measured by a transfer characteristics measuring device according to the invention, the delay time, the propagation time and the like can be displayed on the display section and used for updating the parameters of each amplifier of the amplifier section that is an object of measurement m order to regulate each channel according to the transfer function.

Now, how the transfer characteristics are used in an actual multi-channel acoustic reproduction environment will be described below.

The distance between each speaker and the listening position is defined for an AV amplifier in many cases. Thus, propagation time is reduced to distance by using the speed of sound. The polarity of the speaker can be judged to be positive or negative by the peak value of the impulse response of each channel. Thus, the level difference between two channels can be determined by seeing the difference of the peak values of the time-energy curves of the channels. Then, it is possible to determine the speaker size by seeing to the extent to which the low frequency band can be reproduced, referring to the amplitude characteristic of the transfer function. If there is no microphone input signal (or the level of the microphone input signal is lower than a predetermined value) while there is an original signal, it may be judged that the channel is not connected.

The present invention is by no means limited to the embodiments described above by referring to the accompanying drawings and it may be clear to those skilled in the art that the above described embodiments can be modified and altered in many different ways without departing from the scope of the invention.

INDUSTRIAL APPLICABILITY

A transfer characteristics measuring device and a transfer characteristics measuring method according to the invention can automatically measure the transfer characteristics of each channel of a multi-channel acoustic reproduction system in a multi-channel acoustic reproduction environment, while allowing normal multi-channel reproduction to proceed.

A transfer characteristics measuring computer program according to the invention can make a computer to operate as a transfer characteristics measuring device that can automatically measure the transfer characteristics of each channel of a multi-channel acoustic reproduction system in a multi-channel acoustic reproduction environment, while allowing the system to operate for normal multi-channel reproduction.

According to the invention, there is provided an amplifier in which the transfer characteristics of each channel can be automatically measured in a multi-channel acoustic reproduction environment.

Thus, according to the invention, it is possible to automatically measure the transfer characteristics of each channel of a multi-channel acoustic reproduction system without the need of reproducing a test tone for each channel on a channel by channel basis, while allowing normal multi-channel reproduction to proceed.

Since surround signals are often used for sound effects, they may frequently be mute signals. Therefore, it may be necessary to detect and measure the surround signals contained in the source signal when the original source signal is used. The present invention can accommodate such a situation.

The invention claimed is:

1. A transfer characteristics measuring device for measuring transfer characteristics of each of n objects of measurement out of m objects of measurement, where n is less than or equal to m, using input signals being input to the m objects of measurement and output signals from the objects of measurement in an acoustic reproduction environment for m channels having mutually differentiated respective spatial positions, the device comprising:

- object of measurement selecting means for selecting an object of measurement out of the n objects of measurement according to levels of the input signals of the m channels being supplied to the m objects of measurement; and
- transfer characteristics computing and determining means for:
  - computing the transfer characteristics of the object of measurement selected by the object of measurement selecting means according to an input signal being supplied to the object of measurement and an output signal of the object of measurement corresponding to the input signal, and
  - determining adoption of the transfer characteristics of the object of measurement, excluding the object of measurement from the m objects of measurement, wherein:
- the transfer characteristics computing and determining means includes:
- orthogonal transformation means for performing an orthogonal transformation on the input signals supplied to the object of measurement selected by the object of measurement selecting means and on the output signals of the object of measurement corresponding to the input signals;
- power spectrum computing means for computing power spectrums of the input signals and power spectrums of the output signals, using spectrums of the input signals and spectrums of the output signals obtained by the orthogonal transformation means;
- cross spectrum computing means for multiplying a frequency component of the spectrum of each input signal by a frequency component of the spectrum of the corresponding output signal obtained by the orthogonal transformation means to computationally determine cross spectrums;
- spectrum average computing means for computing an average value of the power spectrums of the input signals, an average value of the power spectrums of the output signals, and an average value of the cross spectrums;
- transfer characteristics computing means for computing transfer characteristics of the object of measurement from the average values of the power spectrums and the average value of the cross spectrums;
- coherence computing means for computing a value of the coherence from the average value of the power spectrums of the input signals, the average value of the power spectrums of the output signals and the average value of the cross spectrums; and
- transfer characteristics determining means for determining adoption of the transfer characteristics of the object of measurement according to the coherence value and for excluding the object of measurement from the plurality of objects of measurement.

2. The device according to claim 1, wherein the object of measurement selecting means includes:

Intake means for taking in the input signals of the m channels being applied to the m objects of measurement;

Level detecting means for detecting the level of each of the input signals of the m channels taken in by the intake means; and Selecting means for selecting one of the objects of measurement according to the levels detected by the level detecting means.

3. The device according to claim 2, wherein the selecting means of the object of measurement selecting means selects the object of measurement that receives the input signal that shows the highest level among the input signals supplied to the m objects of measurement and taken in during a predetermined time period by the intake means.

4. The device according to claim 2, wherein the selecting means of the object of measurement selecting means selects the objects of measurement that receives the input signal that shows the highest level among the input signals supplied to the m objects of measurement and taken in during a predetermined time period by the intake means and, a level difference greater than a predetermined value when compared with the other input signals.

5. The device according to claim 2, wherein the selecting means of the object of measurement selecting means selects the object of measurement that is specified in the input signals supplied to the m objects of measurement taken in during a predetermined time period by the intake means and receives the input signal that shows the highest level.

6. The device according to claim 1, wherein the transfer characteristics determining means of the transfer characteristics computing and determining means determines transfer characteristics for each measuring point on a frequency axis in the orthogonal transformation when the coherence value is not smaller than a threshold value showing that the object of measurement is not influenced by the other objects of measurement.

7. The device according to claim 1, wherein the orthogonal transformation means of the transfer characteristics computing and determining means repeats the orthogonal transformation n times.

8. The device according to claim 7, wherein the spectrum average computing means of the transfer characteristics computing and determining means computes the average values of the power spectrums and the average value of the cross spectrums, using the number of n times for which the orthogonal transformation means repeats the orthogonal transformation.

9. The device according to claim 8, wherein the transfer characteristics determining means of the transfer characteristics computing and determining means determines the transfer characteristics according to the average values of the power spectrums and the average value of the cross spectrums according to the number of n times for which the orthogonal transformation means repeats the orthogonal transformation similarly according to the coherence value.

10. The device according to claim 6, wherein, when there is at least a frequency point where the coherence value is not greater than the threshold value, the transfer characteristics determining means of the transfer characteristics computing and determining means determines adoption of the transfer characteristics, repeating a processing operation of judging if the coherence value of the object of measurement is not smaller than the threshold value for a predetermined number of times Z.

11. The device according to claim 10, wherein, when there is at least a frequency point where the coherence value is not greater than the threshold value if the processing operation of judging is repeated for the predetermined number of times Z, the transfer characteristics determining means of the transfer characteristics computing and determining means computes a transfer function of the frequency point, using already computed transfer functions of the other frequency points.

12. The device according to claim 6, wherein, when there is at least a frequency point where the coherence value is not greater than the threshold value, the transfer characteristics determining means of the transfer characteristics computing and determining means determines adoption of the transfer characteristics by judging if a coherence value of a new object of measurement selected by the object of measurement selecting means is not smaller than the threshold value and repeating a processing operation of judging if the coherence value of each of the selected objects of measurement is not smaller than the threshold value for a predetermined number of times Z.

13. The device according to claim 12, wherein, when there is at least a frequency point where the coherence value is not greater than the threshold value if the processing operation of judging is repeated for the predetermined number of times Z, the transfer characteristics determining means of the transfer characteristics computing and determining means computes a transfer function of the frequency point, using already computed transfer functions of the other frequency points.

14. The device according to claim 1, wherein, when there is at least an object of measurement adapted to be in charge of a frequency band not higher than 120 Hz out of the m objects of measurement, the transfer characteristics determining means of the transfer characteristics computing and determining means makes transfer functions of the remaining objects of measurement for the same frequency band unrelated to the coherence value.

15. The device according to claim 1, further comprising:
parameter output means for outputting parameters relating to the transfer characteristics of the n objects of measurement according to a transfer function, adoption of which is determined by the transfer characteristics computing and determining means.

16. A transfer characteristics measuring method for measuring the transfer characteristics of each of n objects of measurement out of m objects of measurement, wherein n is less than or equal to m, using input signals being input to the m objects of measurement and output signals from the objects of measurement in an acoustic reproduction environment for m channels having mutually differentiated respective spatial positions, the method comprising:
an object of measurement selecting step for selecting an object of measurement out of the n objects of measurement according to levels of the input signals of the m channels being supplied to the m objects of measurement; and
a transfer characteristics computing and determining step of:
computing the transfer characteristics of the object of measurement selected in the object of measurement selecting step according to an input signal being supplied to the object of measurement and an output signal of the object of measurement corresponding to the input signal, and
determining adoption of the transfer characteristics of the object of measurement, excluding the object of measurement from the m objects of measurement, wherein:
the transfer characteristics computing and determining step includes:
an orthogonal transformation step of performing an orthogonal transformation on the input signals supplied to the object of measurement selected in the object of measurement selecting step and on the output signals of the object of measurement corresponding to the input signals;
a power spectrum computing step of computing power spectrums of the input signals and power spectrums of the output signals, using spectrums of the input signals and spectrums of the output signals obtained by the orthogonal transformation step;
a cross spectrum computing step of multiplying a frequency component of the spectrum of each input signal by a frequency component of the spectrum of the corresponding output signal obtained by the orthogonal transformation step to computationally determine cross spectrums;
a spectrum average computing step of computing an average value of the power spectrums of the input signals, an average value of the power spectrums of the output signals, and an average value of the cross spectrums;
a transfer characteristics computing step of computing transfer characteristics of the object of measurement from the average values of the power spectrums and the average value of the cross spectrums;
a coherence computing step of computing a value of the coherence from the average value of the power spectrums of the input signals, the average value of the power spectrums of the output signals and the average value of the cross spectrums; and
a transfer characteristics determining step of determining adoption of the transfer characteristics of the object of measurement according to the coherence value and of excluding the object of measurement from the plurality of objects of measurement.

17. A transfer characteristics measuring device for measuring the transfer characteristics of each of n objects of measurement out of m objects of measurement where n is less than or equal to m, using input signals being input to the m objects of measurement and output signals from the objects of measurement in an acoustic reproduction environment for m channels having mutually differentiated respective spatial positions, the device comprising:
object of measurement selecting means for selecting an object of measurement according to levels of the input signals of the m channels being supplied to the m objects of measurement; and
transfer characteristics computing and determining means for computing the transfer characteristics of the object of measurement selected by the object of measurement selecting means according to an input signal being supplied to the object of measurement and an output signal of the object of measurement corresponding to the input signal for each frequency point and adopting the transfer characteristics of the object of measurement in concurrence with computing and adopting of the transfer characteristics of each of the objects of measurement selected by the object of measurement selecting means from the n objects of measurement for each frequency point, wherein:
the transfer characteristics computing and determining means includes:
orthogonal transformation means for performing an orthogonal transformation on the input signals supplied to the object of measurement selected by the object of measurement selecting means and on the output signals of the object of measurement corresponding to the input signals;

power spectrum computing means for computing power spectrums of the input signals and power spectrums of the output signals, using spectrums of the input signals and spectrums of the output signals obtained by the orthogonal transformation means;

cross spectrum computing means for multiplying a frequency component of the spectrum of each input signal by a frequency component of the spectrum of the corresponding output signal obtained by the orthogonal transformation means to computationally determine cross spectrums;

spectrum average computing means for computing an average value of the power spectrums of the input signals, an average value of the power spectrums of the output signals, and an average value of the cross spectrums;

transfer characteristics computing means for computing transfer characteristics of the object of measurement from the average values of the power spectrums and the average value of the cross spectrums;

coherence computing means for computing a value of the coherence from the average value of the power spectrums of the input signals, the average value of the power spectrums of the output signals and the average value of the cross spectrums; and transfer characteristics determining means for determining adoption of, for each frequency point, the transfer characteristics of the object of measurement according to the coherence value in concurrence with computation and adoption for each frequency point of the transfer characteristics of each of the objects of measurement selected out of the n objects of measurement by the object of measurement selecting means.

18. A transfer characteristics measuring device for measuring the transfer characteristics of each of n objects of measurement out of m objects of measurement where n is less than or equal to m, using input signals being input to the m objects of measurement and output signals from the objects of measurement in an acoustic reproduction environment for m channels having mutually differentiated respective spatial positions, the device comprising:

object of measurement selecting means for selecting an object of measurement according to levels of the input signals of the m channels being supplied to the m objects of measurement; and transfer characteristics computing and determining means for computing the transfer characteristics of the object of measurement selected by the object of measurement selecting means according to an input signal being supplied to the object of measurement and an output signal of the object of measurement corresponding to the input signal for each frequency point and adopting the transfer characteristics of the object of measurement in concurrence with computing and adopting of the transfer characteristics of each of the objects of measurement selected by the object of measurement selecting means from the n objects of measurement for each frequency point, wherein:

the object of measurement selecting means includes:

intake means for taking in the input signals of the m channels being supplied to the m objects of measurement;

level detecting means for detecting the level of each of the input signals of the m channels taken in by the intake means; and selecting means for selecting one of the objects of measurement according to the levels detected by the level detecting means, wherein the object of measurement selecting means selects an object of measurement that is specified in the input signals supplied to the m objects of measurement and taken in during a predetermined time period by the intake means and receives the input signal that shows a highest level.

19. The device according to claim 17, wherein the transfer characteristics determining means of the transfer characteristics computing and determining means determines transfer characteristics for each measuring point on a frequency axis in the orthogonal transformation when the coherence value is not smaller than a threshold value showing that the object of measurement is not influenced by the other objects of measurement.

20. The device according to claim 17, wherein the orthogonal transformation means of the transfer characteristics computing and determining means repeats the orthogonal transformation n times.

21. The device according to claim 20, wherein the spectrum average computing means of the transfer characteristics computing and determining means computes the average values of the power spectrums and the average value of the cross spectrums, using the number of n times for which the orthogonal transformation means repeats the orthogonal transformation.

22. The device according to claim 21, wherein the transfer characteristics determining means of the transfer characteristics computing and determining means determines the transfer characteristics according to the average values of the power spectrums and the average value of the cross spectrums according to the number of n times for which the orthogonal transformation means repeats the orthogonal transformation similarly according to the coherence value.

23. The device according to claim 20, wherein, when there is at least a frequency point where the coherence value is not greater than the threshold value, the transfer characteristics determining means of the transfer characteristics computing and determining means determines adoption of the transfer characteristics by judging if the coherence value of a new object of measurement selected by the object of measurement selecting means out of the n objects of measurement including the object of measurement is not smaller than the threshold value and repeating a processing operation of judging if the coherence value of each of the selected objects of measurement is not smaller than the threshold value for a predetermined number of times Z.

24. The device according to claim 23, wherein, when there is at least a frequency point where the coherence value is not greater than the threshold value if the processing operation of judging is repeated for the predetermined number of times Z, the transfer characteristics determining means of the transfer characteristics computing and determining means computes a transfer function of the frequency point, using already computed transfer functions of the other frequency points.

25. The device according to claim 17, wherein, when there is at least an object of measurement adapted to be in charge of a frequency band not higher than 120 Hz out of the m objects of measurement, the transfer characteristics determining means of the transfer characteristics computing and determining means makes transfer functions of the remaining objects of measurement for the same frequency band unrelated to the coherence value.

26. A transfer characteristics measuring method for measuring the transfer characteristics of each of n objects of measurement out of m objects of measurement, where n is less than or equal to m, using input signals being input to the m objects of measurement and output signals from the objects of measurement in an acoustic reproduction environment for m channels having mutually differentiated respective spatial positions, the method comprising:

an object of measurement selecting step of selecting an object of measurement according to levels of the input signals of the m channels being supplied to the m objects of measurement; and a transfer characteristics computing and determining step of:

computing the transfer characteristics of the object of measurement selected in the object of measurement selecting step according to an input signal being supplied to the object of measurement and an output signal of the object of measurement corresponding to the input signal for each frequency point and adopting the transfer characteristics of the object of measurement in concurrence with computing and adopting of the transfer characteristics of each of the objects of measurement selected by the object of measurement selecting step from the n objects of measurement for each frequency point, wherein:

the transfer characteristics computing and determining step includes:

an orthogonal transformation step of performing an orthogonal transformation on the input signals supplied to the object of measurement selected in the object of measurement selecting step on and the output signals of the object of measurement corresponding to the input signals;

a power spectrum computing step of computing power spectrums of the input signals and power spectrums of the output signals, using spectrums of the input signals and spectrums of the output signals obtained by the orthogonal transformation step;

a cross spectrum computing step of multiplying a frequency component of the spectrum of each input signal by a frequency component of the spectrum of the corresponding output signal obtained by the orthogonal transformation step to computationally determine cross spectrums;

a spectrum average computing step of computing an average value of the power spectrums of the input signals, and an average value of the power spectrums of the output signals, and an average value of the cross spectrums;

a transfer characteristics computing step of computing transfer characteristics of the object of measurement from the average values of the power spectrums and the average of the cross spectrums;

a coherence computing step of computing a value of the coherence from the average value of the power spectrums of the input signals, the average value of the power spectrums of the output signals and the average value of the cross spectrums; and a transfer characteristics determining step of determining adoption of, for each frequency point, the transfer characteristics of the object of measurement according to the coherence value in concurrence with computation and adoption for each frequency point of the transfer characteristics of each of the objects of measurement selected out of the n objects of measurement in the object of measurement selecting step.

27. A transfer characteristics measuring computer program recorded on a computer readable medium to be executed by a transfer characteristics measuring device for measuring the transfer characteristics of each of n objects of measurement out of m objects of measurement, where n is less than or equal to m, using input signals being input to the m objects of measurement and output signals from the objects of measurement in an acoustic reproduction environment for m channels having mutually differentiated respective spatial positions, the computer program comprising instructions for executing:

an object of measurement selecting step of selecting an object of measurement according to levels of the input signals of the m channels being supplied to the m objects of measurement; and a transfer characteristics computing and determining step of:

computing the transfer characteristics of the object of measurement selected in the object of measurement selecting step according to an input signal being supplied to the object of measurement and an output signal of the object of measurement corresponding to the input signal for each frequency point and adopting of the transfer characteristics of the object of measurement in concurrence with computing and adopting the transfer characteristics of each of the objects of measurement selected by the object of measurement selecting step from the n objects of measurement for each frequency point, wherein:

the transfer characteristics computing and determining step, includes:

an orthogonal transformation step of performing an orthogonal transformation on the input signals supplied to the object of measurement selected in the object of measurement selecting step and on the output signals of the object of measurement corresponding to the input signals;

a power spectrum computing step of computing power spectrums of the input signals and power spectrums of the output signals, using spectrums of the input signals and spectrums of the output signals obtained by the orthogonal transformation step;

a cross spectrum computing step of for multiplying a frequency component of the spectrum of each input signal by a frequency component of the spectrum of the corresponding output signal obtained by the orthogonal transformation step to computationally determine cross spectrums;

a spectrum average computing step of computing an average value of the power spectrums of the input signals, and an average value of the power spectrums of the output signals, and an average value of the cross spectrums;

a transfer characteristics computing step of computing transfer characteristics of the object of measurement from the average values of the power spectrums and the average of the cross spectrums;

a coherence computing step of computing a value of the coherence from the average value of the power spectrums of the input signals, the average value of the power spectrums of the output signals and the average value of the cross spectrums; and a transfer characteristics determining step of determining adoption of, for each frequency point, the transfer characteristics of the object of measurement according to the coherence value in concurrence with computation and adoption for each frequency point of the transfer characteristics of each of the objects of measurement selected out of the n objects of measurement in the object of measurement selecting step.

* * * * *